(12) United States Patent
Giampavolo

(10) Patent No.: US 8,015,735 B2
(45) Date of Patent: Sep. 13, 2011

(54) COMBINATION AD SIGN AND CHILD SEAT SAFETY STRAP

(76) Inventor: Paul Giampavolo, Budd Lake, NJ (US)

( * ) Notice: Subject to any disclaimer, the term of this patent is extended or adjusted under 35 U.S.C. 154(b) by 0 days.

(21) Appl. No.: 12/946,255

(22) Filed: Nov. 15, 2010

(65) Prior Publication Data

US 2011/0056103 A1    Mar. 10, 2011

Related U.S. Application Data

(63) Continuation of application No. 12/489,892, filed on Jun. 23, 2009, now Pat. No. 7,849,615, which is a continuation of application No. 11/240,154, filed on Sep. 30, 2005, now abandoned.

(51) Int. Cl.
*G09G 3/00* (2006.01)
(52) U.S. Cl. ..................... 40/308; 297/256.17
(58) Field of Classification Search ............. 40/308; 297/256.17; 280/33.993, 33.992
See application file for complete search history.

(56) References Cited

U.S. PATENT DOCUMENTS

| 4,324,430 | A  | * | 4/1982 | Dimas et al. | 297/256.17 |
| 5,855,412 | A  | * | 1/1999 | Smith et al. | 297/256.17 |
| 6,186,521 | B1 | * | 2/2001 | Divoky et al. | 280/33.993 |
| 6,575,480 | B2 | * | 6/2003 | McKelvey | 280/33.993 |

* cited by examiner

*Primary Examiner* — Gary C Hoge
(74) *Attorney, Agent, or Firm* — Ostrolenk Faber LLP

(57) ABSTRACT

An ad sign to be mounted on a seat back of a shopping cart child seat, the ad sign comprising one or more frame bodies configured to display information content, each frame body having a front side and a back side, one of the one or more frame bodies being configured to be connected to a first face of the seat back; and one or more safety strap anchors integral with the one frame body, the one or more safety strap anchors being configured and adapted for securing a child seat safety strap within the child seat; wherein at least one of the one or more safety strap anchors extends from a perimeter of the one frame body; wherein at least one of the one or more safety strap anchors forms a respective opening, the at least one safety strap anchor being configured such that the child seat safety strap can be passed through the opening and connected to the seat back, and being further configured so as to limit a movement of the child seat safety strap when the strap is passed through the opening and connected to the seat back.

12 Claims, 28 Drawing Sheets

COMBINATION AD SIGN AND CHILD SEAT SAFETY STRAP

CROSS REFERENCE TO RELATED APPLICATIONS

This is a continuation of U.S. patent application Ser. No. 12/489,892, filed Jun. 23, 2009 entitled COMBINATION AD SIGN AND CHILD SEAT SAFETY STRAP, which is a continuation of U.S. patent application Ser. No. 11/240,154 filed Sep. 30, 2005 entitled COMBINATION AD SIGN AND CHILD SEAT SAFETY STRAP.

BACKGROUND OF THE INVENTION

1. Field of the Invention

The present invention relates to an ad sign for a shopping cart child seat and, in particular, to an ad sign that allows a child safety strap to be provided with the shopping cart child seat.

2. Description of the Prior Art

Supermarkets and department stores, for example, often provide shopping carts for the convenience of shoppers. These carts typically include a basket for holding items and a child seat that allows a child to sit in the cart. For example, referring to FIG. 1A there is shown a shopping cart child seat 100a of the prior art. Child seat 100a includes a seat bottom 102 and a seat back 104. The seat back in particular may be formed from a plurality of horizontal and vertical metal bars/rails 106, for example, that are interconnected to form a plurality of slots and openings 108. Referring to FIG. 1B, there is shown another example child seat 100b of the prior art. Here, the seat back is formed from molded plastic, for example, creating a plurality of vertical and horizontal plastic segments 110, for example, with slots and openings 108 there-between. One skilled in the art will recognize that numerous other styles and types of shopping cart child seats exist.

For safety reasons, shopping cart child seats typically include a "safety strap" for securing a child to the seat. For example, referring to FIG. 2A there is shown safety strap 200a of the prior art. Safety strap 200a includes segments of webbing 202, for example, with a detachable buckle 204 there-between. Webbing 202 may have a width 207 of about 1 to 2 inches, for example, although any suitable width that comfortably and securely restrains a child may be used. The strap may also include an adjuster 205 so that the length of the strap can be adjusted. At each end of strap 200a is a fastener 206, such as an interlocking loop (as shown in FIG. 2A) or a hook, although other suitable fasteners may be used. As illustrated in FIG. 2B, safety strap 200a may be connected to seat back 104 of a child seat, like child seat 100a, by attaching fasteners 206 to metal bars 106 at different points such that buckle 204 resides in the front of the child seat. Similarly, safety strap 200a may be connected to the seat back of child seat 100b, for example, by connecting fasteners 206 to different plastic segments 110. Notably, fasteners 206 of strap 200a may be of a form such that once connected to the seat back, the fasteners are permanently attached, for example. Alternatively, fasteners 206 may be of a detachable form such that the fasteners can be attached to and removed from the seat back, for example.

Referring to FIG. 2C, there is illustrated another example shopping cart child seat of the prior art. Here, two safety straps 200a are attached to seat back 104 in order to hold two children. Referring to FIG. 2D there is illustrated a variation of strap 200a. Here, the safety strap includes an additional strap segment 209 that connects between the child's legs to seat bottom 102. In another example variation of strap 200a, the strap does not include a buckle 204, for example. Here, one of the fasteners 206, for example, is of a detachable form, allowing the fastener to be attached to and removed from seat back 104 in order to insert and remove a child from the child seat.

Referring to FIG. 2E there is illustrated another example safety strap 200b of the prior art. Strap 200b is a continuous loop of webbing 202, for example, with a detachable buckle 204 connecting opposing ends. Strap 200b may also include an adjuster 205 for varying the length of the strap. As illustrated in FIG. 2F, safety strap 200b may be connected to seat back 104 of a child seat by interleaving webbing 202 through one or more slots/openings 108 and possibly around one or more bars 106 such that webbing 202 extends across seat back 104 and buckle 204 resides in the front of the child seat, for example. Alternatively, the strap may be reversed such that buckle 204 is behind the seat back and webbing 202 extends across the front of the seat back and around the child, for example. In general, one skilled in the art will recognize that safety straps 200a and 200b are merely example safety straps and other forms of safety straps exist. One skilled in the art will also recognize that other suitable ways for attaching safety straps to child seats exist, in addition to those described above.

Significantly, whether a given safety strap is connected by fasteners to the seat back of a child seat, is interleaved through openings and/or around bars of the seat back, or is attached by some other suitable mechanism, the attachment points or interleaved points of the safety strap to the seat back must be selected to ensure that once a child is placed in the child seat, the safety strap securely holds the child to the seat. In particular, child occupancy standards are defined for shopping cart child seats. In general, according to these standards, a safety strap is attached at points to a child seat and is used to secure a test dummy, cylinder, or other device, for example, to the seat. Specified tests are thereafter performed to determine, for example, if the selected attachment points of the safety strap to the child seat meet occupancy retention performance requirements. These tests may include pull tests whereby a dummy, for example, is secured with the safety strap and then pulled with 40 lbs of force. According to this test, the dummy should not be able to be pulled free from the child seat. Various other test methods may also be required to ensure occupancy retention performance requirements are met. Hereinafter, the attachment points or interleaved points at which a safety strap connects to a child seat such that the safety strap meets occupancy retention performance requirements will be referred to as "suitable attachment points" or "designated attachment points".

Notably, there are numerous different types of shopping carts each with a different style of child seat. For example, FIGS. 1A, 1B, 2B, 2C, 2D, and 2F each shows a different style child seat. Each of these child seats has suitable/designated attachment points for a given safety strap, which attachment points and safety strap have been tested according to the above described standards to ensure the occupancy retention performance requirements are met and that a child cannot easily slip free of the safety strap and fall from the shopping cart.

In general, the suitable/designated attachment points of a given child seat for a given safety strap are selected to be suitably spaced. While there is no specific spacing requirement, it is generally necessary that the attachment points be placed close together in a range of 0 to 12 inches, for example. In addition, the attachment points are generally selected to ensure the fasteners or interleaved webbing, for example, of the strap do not slide along the seat back to various positions. In general such sliding of a safety strap may allow a child to slip free of the belt. For example, referring to child seats 100*a* and 100*b* of FIGS. 1A and 1B, the safety strap is preferably connected at attachment points 112*a/b* and 114*a/b*. In particular, with respect to child seat 100*a* for example, fasteners 206 of safety strap 200*a*, for example, are preferably attached to horizontal bar 106*b* at attachment points 112*a* and 112*b*. At these locations, horizontal bar 106*b* prevents the fasteners from making large vertical movements and vertical bars 106*a* prevent the fasteners from making large horizontal movements. Conversely, if fasteners 206 were connected to attachment points 116*a/b*, for example, the fasteners would freely slide vertically along vertical bars 106*c*, possibly allowing a child to slip free of the belt.

Ad signs for shopping carts are also well known. For example, U.S. Pat. No. 3,956,841 to Hensel, U.S. Pat. No. 4,773,175 to Larsen, and U.S. Pat. No. 5,901,482 to Sawyer et al. each discloses an example ad sign for connection to a shopping cart. Ad signs may display store directory information, such as which isle various goods may be found, or may display advertisements. Ad signs typically include a mechanism for attaching the sign to the shopping cart and may also include a mechanism that allows for interchangeable ads, for example.

As described in each of the above patents for example, ad signs are often connected directly to the front face of the seat back of the shopping cart child seat so that an operator of the shopping cart can directly view the ad sign while pushing the cart. However, the connection of ad signs to shopping cart seat backs often conflicts with safety straps. Specifically, as described above, each type of child seat has designated/suitable attachment points for a safety strap. However, as illustrated in FIG. 3 for example, which shows example child seat 100*a* with an example ad sign 302 connected to seat back 104, ad signs often conceal the designated/suitable safety strap attachment points, such as points 112*a* and 112*b*. As a result of this conflict, the safety strap either is removed from the child seat or is never attached to the child seat. Alternatively, the safety strap is often connected to unsuitable attachment points, such as points 116*a* and 116*b*, that do not adequately secure a child because the safety strap can horizontally or vertically slide, for example.

SUMMARY OF THE INVENTION

Accordingly, it is desirable to provide an ad sign for a shopping cart child seat that operates in combination with a child seat safety strap, thereby overcoming the above and other disadvantages of the prior art. According to an embodiment of the invention, an ad sign includes at least one frame body with a content display area on the front side thereof for displaying information content. The ad sign also includes a frame attachment mechanism for securing the back side of the frame body, for example, to the front face of the seat back of a shopping cart child seat, for example, thereby allowing an operator of the shopping cart to view the displayed information content. The information content may be directly printed/formed within the content display area, may be one or more display cards permanently affixed to the content display area, may be one or more removable/replaceable display cards secured within the content display area, or some combination thereof. When the content display area is configured to receive replaceable display cards, the ad sign may further include a display card attachment mechanism for securing the cards within the content display area.

According to an embodiment of the invention, the ad sign further includes one or more safety strap openings, such as two, formed within the frame body and that extend from the front side to the back side of the frame body. According to an aspect of the invention, the safety strap openings may be formed completely within the frame body or alternatively, may be formed as indentations that extend from the perimeter of the frame body inward towards the content display area, for example. According to another aspect of the invention, the safety strap openings may be formed within the frame body such that the openings are beyond/outside of the content display area. Alternatively, the safety strap openings may be formed partially or totally within the content display area.

According to an embodiment of the invention, the safety strap openings expose and/or provide access to points on the seat back, thereby allowing a safety strap to be inserted through the openings and suitably attached/secured to the seat back, for example. More specifically, according to an embodiment of the invention, the safety strap openings may be positioned and configured on the frame body such that once the frame body is secured to the seat back, the safety strap openings provide access to the designated safety strap attachment points on the seat back that the ad sign would otherwise conceal. Notably, if the safety strap openings are positioned/configured to extend within the content display area and permanent and/or replaceable display card(s) are to be placed within the content display area, the display card(s) preferably also include one or more openings that coincide with the safety strap openings. According to this embodiment of the invention, a safety strap may be inserted through one or more of the safety strap openings in the frame body (and possibly the openings in the display card) and secured to the seat back in the normal manner. For example, fasteners 206 of a safety strap 200*a* may be secured directly to the seat back. Accordingly, an ad sign of the present invention both displays information content to an operator of the shopping cart and also allows a child safety strap to be provided with and suitably secured within the child seat.

According to another embodiment of the invention, the safety strap openings are positioned and configured such that once the frame body is secured to the seat back, the safety strap openings reside over points along the seat back that are not designated/approved safety strap attachment points. For example, the openings may reside over points along bars of the seat back, for example, that would normally (i.e., when no ad sign is present) not be suitable attachment points for a safety strap because the strap would slide along the bars, allowing a child to slip free. Alternatively, the safety strap openings may reside over the slots/openings between the bars of the seat back, for example. According to an embodiment of the invention, the safety strap openings of the ad sign now allow a safety strap to be connected to the seat back at the exposed points, thereby establishing/forming secondary suitable attachment points on the seat back. In other words, the safety strap openings of the ad sign establish safety strap attachment points on the seat back such that when a safety strap is inserted through the safety strap openings and secured to the seat back at these points, the strap meets occupancy retention performance requirements as defined by tests set forth by the child occupancy standards. As an example, a safety strap may be passed through one or more of the safety strap openings and secured to the bars, for example, on the seat back. Here, the outer perimeter edges/sides of the safety strap openings now act as positioning elements/guides, preventing the safety strap from sliding along the bars, thereby establishing the secondary suitable attachment points for the safety strap.

According to another embodiment of the invention, an ad sign may include one or more safety strap openings as just described and also include a safety strap that may be detachably attached or permanently attached to the ad sign. In this way, rather than securing a safety strap within a child seat by securing the strap to the seat back as described above, the safety strap may be secured within the child seat by securing the strap to the ad sign or to both the ad sign and the seat back. Here again, the ad sign may provide secondary suitable attachment points for the safety strap. As an example, the safety strap may extend through one or more of the safety strap openings and be secured to the back side of the frame body through Velcro or a co-molding process, for example, thereby securing the strap only to the ad sign. Alternatively, the strap may also be looped around/secured to the bars of the seat back, for example, thereby securing the strap to both the ad sign and the seat back. As another example, the ad sign may include one or more safety strap anchors along the back side of the frame body, for example. Here, fasteners on a strap, for example, may be passed through one or more of the safety strap openings and secured to the anchors, thereby securing the strap only to the ad sign. Alternatively, the fasteners may be secured to the anchors and also to bars on the seat back, for example, that may lie in close proximity to the anchors, thereby securing the strap to both the ad sign and the seat back. One skilled in the art will recognize that other attachment variations/combinations are possible.

According to another embodiment of the invention, an ad sign may include two frame bodies, for example, and again, may provide secondary suitable attachment points for a safety strap. Here, a first frame body may be secured to the front face of the seat back and may include a content display area and one or more safety strap openings, as described above. A second frame body may be secured to the back face of the seat back adjacent to the first frame body. The second frame body may or may not include a content display area on the front side thereof and may also include on its back side, for example, one or more safety strap anchors, for example. Here, fasteners, for example, of a safety strap may be inserted through one or more respective safety strap openings of the first fame body and may be secured to respective safety strap anchors of the second frame body, thereby connecting the strap only to the ad sign. Alternatively, the strap may also be secured to the seat back, thereby connecting the strap to both the ad sign and the seat back. Again, one skilled in the art will recognize that other attachment mechanisms may be used to secure the safety strap to the second ad sign. One skilled in the art will also recognize that other attachment variations/combinations are possible.

According to another embodiment of the invention, an ad sign includes a frame body that has a content display area that may be a partial surface that forms one or more cut-outs, for example. Alternatively, the content display area may have a single cut-out thereby forming an open window. Here, the frame body is configured to receive within the content display area one or more permanent and/or replaceable display cards, for example. According to this embodiment of the invention, the display card(s) may have one or more safety strap openings formed therein that coincide with the cut-outs/window and that also coincide, for example, with suitable attachment points on the seat back. In this way, a safety strap may be inserted through one or more of the safety strap openings of the display card(s) and through the cut-outs/window of the frame body and secured to the seat back. According to another embodiment of the invention, the ad sign may also include a safety strap that may be detachably attached or permanently attached to the ad sign, as similarly described above. In this way, a safety strap may be secured within the child seat by securing the strap only to the ad sign or by securing the strap to both the ad sign and the seat back of the child seat, as described above.

According to a further embodiment of the invention, an ad sign may include two frame bodies, for example, as described above. Here, the first frame body on the front face of the seat back may have a display card(s) with safety strap openings formed therein, as just described, and the second frame body on the rear face of the seat back may include safety strap anchors, for example, on the back side thereof. Here, a safety strap may be passed through one or more safety strap openings of the display card(s) and through cut-outs on the first frame body, and then secured to the anchors of the second frame body, as similarly described above.

According to another embodiment of the invention, an ad sign may include a frame body with a content display area on the front side thereof and further include one or more safety strap anchors that are shaped/formed as loops, for example. The safety strap anchors may be attached at any suitable points on the frame body, such as along the perimeter of the frame body, and may extend outward from frame body such that the anchors lie in the same plane as the frame body or may extend at an angle from the frame body, for example. The safety strap anchors may be positioned and configured on the frame body such that once the frame body is secured to the seat back, the safety strap anchors overlap the designated safety strap attachment points on the seat back. Alternatively, the safety strap anchors may positioned and configured so as to overlap points along the seat back that are not designated/approved safety strap attachment points, such as along vertical bars or slots/openings between the bars of the seat back, for example.

According to an embodiment of the invention, a safety strap may be inserted through one or more of the safety strap anchors and secured only to the seat back. When the safety strap anchors coincide with points on the seat back that are not designated/approved safety strap attachment points, the outer perimeter edges/sides of the safety strap anchors may act as positioning elements/guides, preventing the safety strap from moving and thereby establishing secondary suitable attachment points for the safety strap. According to another embodiment of the invention, a safety strap may be secured to one or more of the safety strap anchors and also to the seat back. For example, if the safety strap includes fasteners, the fasteners may be secured to the safety strap anchors and to bars of the seat back, for example, that may lie in close proximity to the anchors. According to a further embodiment of the invention, a safety strap may be secured within the child seat only through the safety strap anchors, for example, thereby securing the strap only to the ad sign. For example, if the safety strap includes fasteners, the fasteners may be secured only to the anchors. One skilled in the art will also recognize that combinations of the above attachments may be used.

According to another embodiment of the invention, an ad sign may include safety strap anchors, as described above. Here, however, the anchors may be positioned on the back side or perimeter, for example, of the frame body and may extend outward from and perpendicular to the back side of the frame body, for example. The ad sign may be used as similarly described above.

According to another embodiment of the invention, an ad sign includes safety strap anchors that are formed within the front side face of the frame body. Here, the anchors may reside in the plane of the frame body or may extend outward or inward from the frame body. Again, the ad sign may be used as similarly described above.

According to another embodiment of the invention, an ad sign may include two frame bodies, for example. Here, a first frame body may be secured to the front face of the seat back and may include a content display area and a second frame body may be secured to the back face of the seat back adjacent the first frame body. The second frame body may or may not include a content display area. According to this embodiment of the invention, both frame bodies may include safety strap anchors or only one frame body may include safety strap anchors, the safety strap anchors being positioned and configured according to any of the above described embodiments.

According to another embodiment of the invention, an ad sign may include a frame body with a content display area on the front side thereof and further include a safety strap. According to an aspect of the invention, each end of the strap may be secured to the frame body using, for example, Velcro or a co-molding process, although other mechanisms may be used. According to another aspect of the invention, one end of the strap may be secured to the frame body and the other end may include a fastener, for example, that is intended to be attached to and removed from the child seat and/or ad sign in order to place a child in and remove a child from the safety strap. As an example, the ad sign may include an anchor onto which the fastener may be secured. According to a further aspect of the invention, the ad sign may include two frame bodies. Here, the safety strap may be secured to one or both frame bodies.

Other features and advantages of the present invention will become apparent from the following description of the invention, which refers to the accompanying drawings.

DESCRIPTION OF THE EMBODIMENTS

Figure 1A:
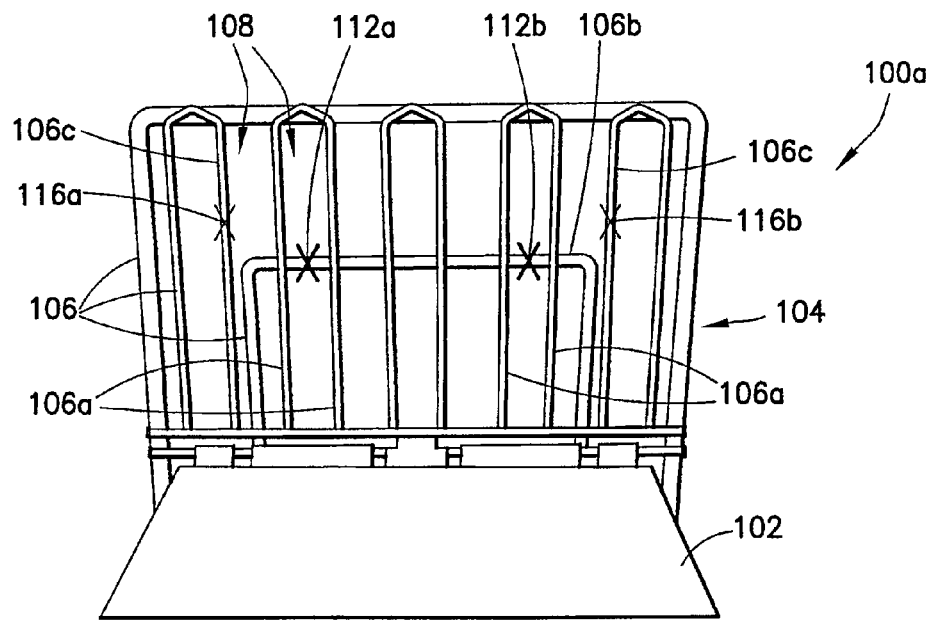
FIGS. 1A and 1B show example prior art shopping cart child seats.
Figure 1B:
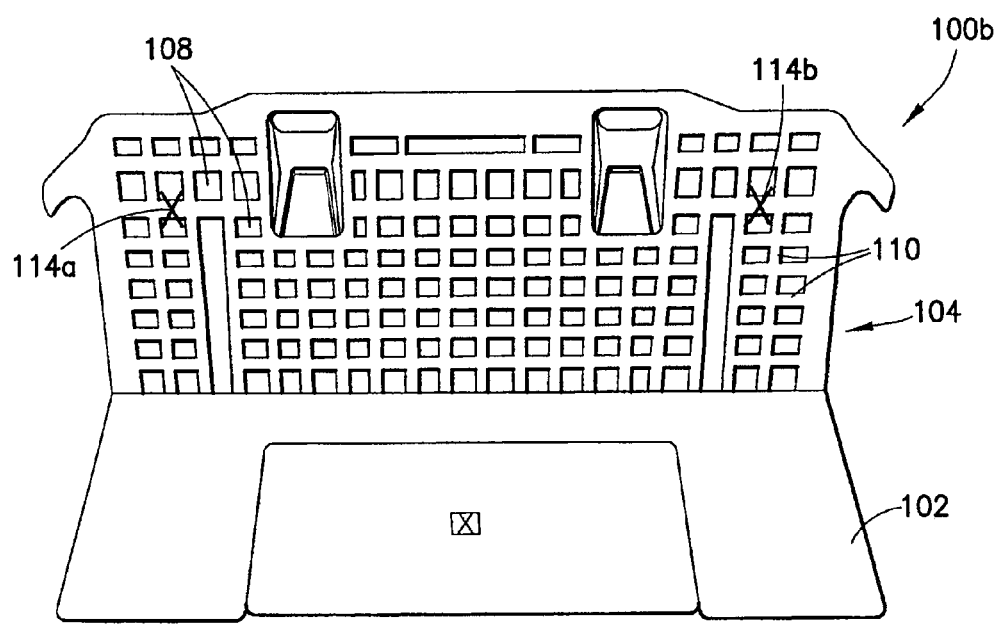
Figure 2A:
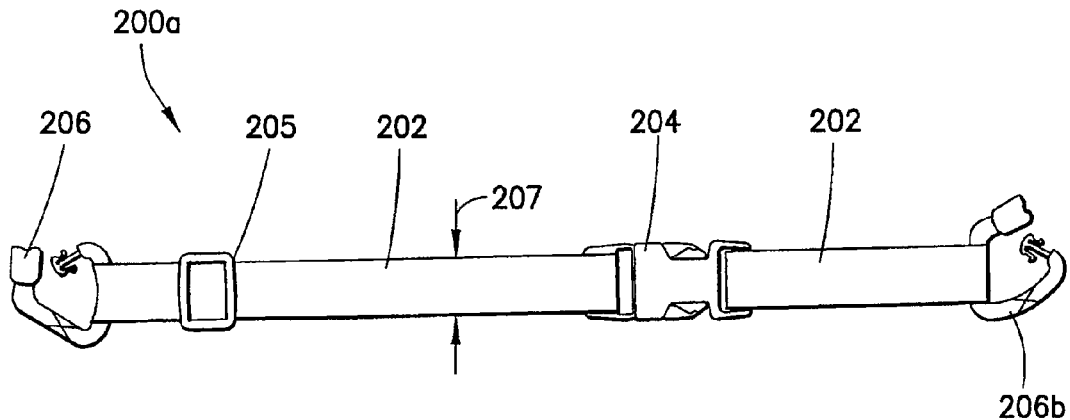
FIG. 2A shows an example prior art safety strap for a shopping cart child seat.
Figure 2B:
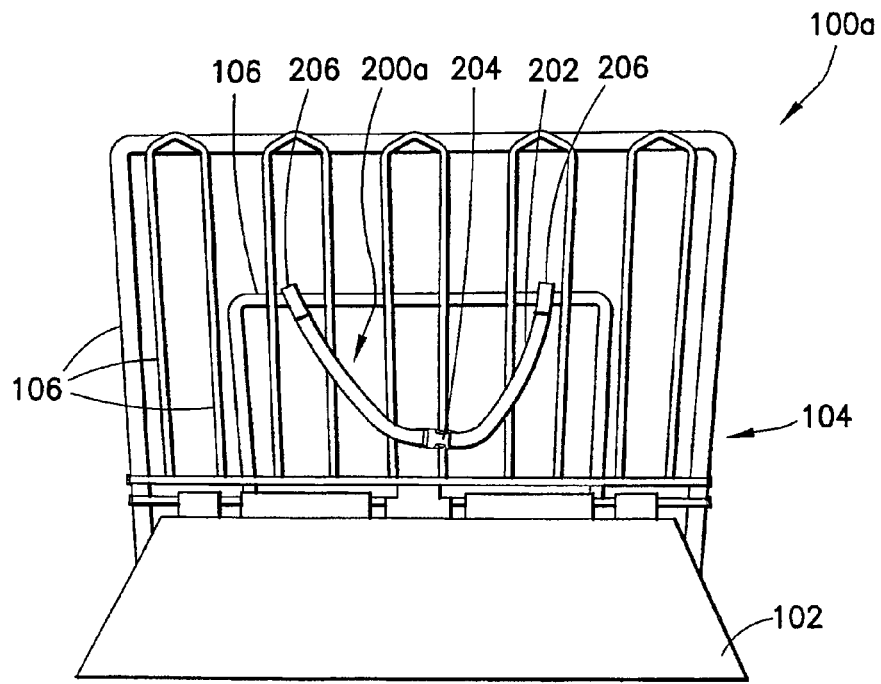
FIG. 2B shows an example prior art installation of the safety strap illustrated by FIG. 2A to the child seat illustrated by FIG. 1A.
Figure 2C:
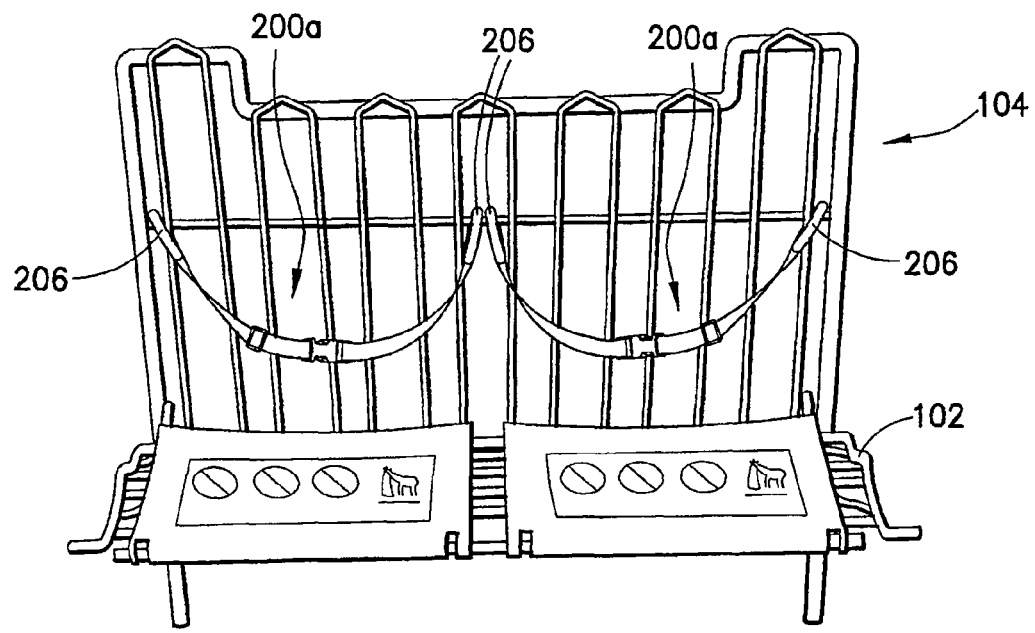
FIG. 2C shows an example prior art installation of two safety straps, each illustrated by FIG. 2A, to an example shopping cart child seat for securing two children.
Figure 2D:
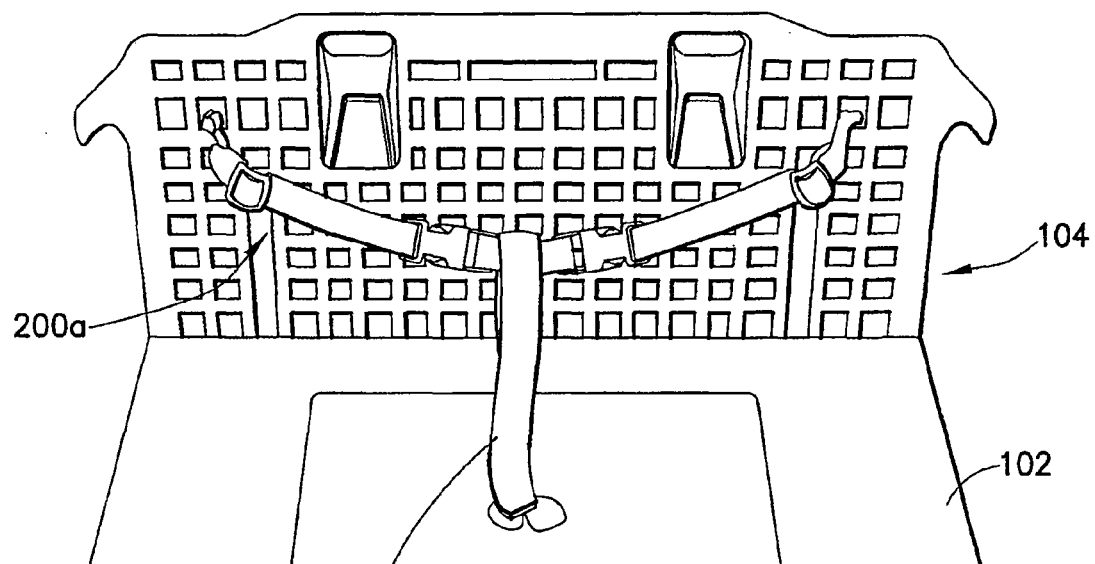
FIG. 2D shows an example prior art safety strap installed on an example shopping cart child seat.
Figure 2E:
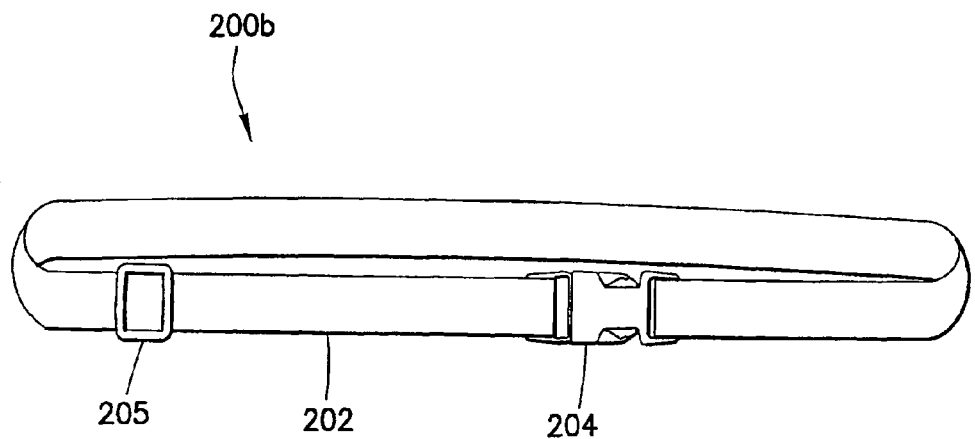
FIG. 2E shows an example prior art safety strap for a shopping cart child seat.
Figure 2F:
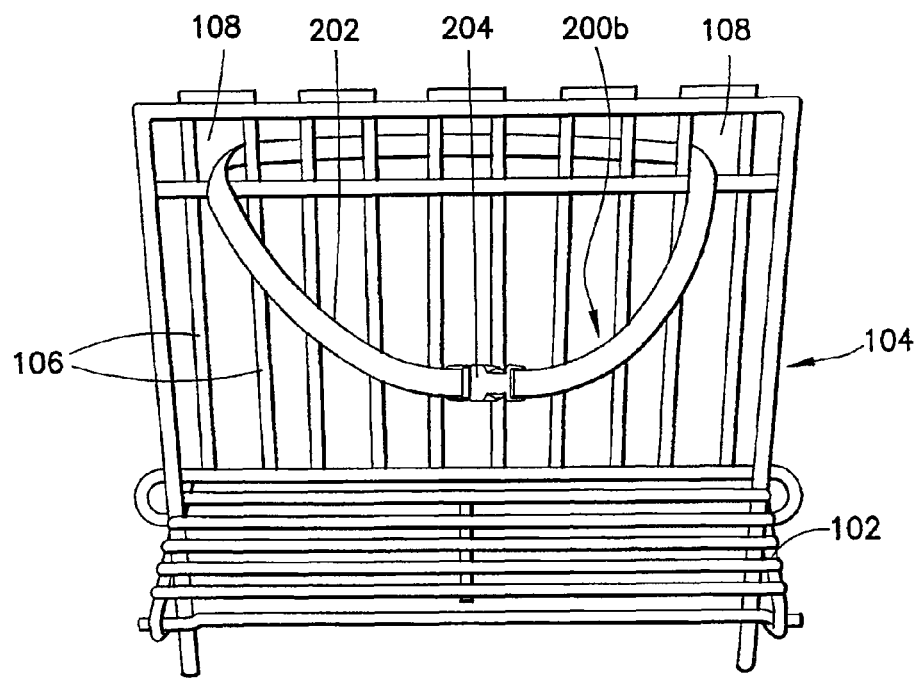
FIG. 2F shows an example prior art installation of the safety strap illustrated by FIG. 2E to an example shopping cart child seat.
Figure 3:
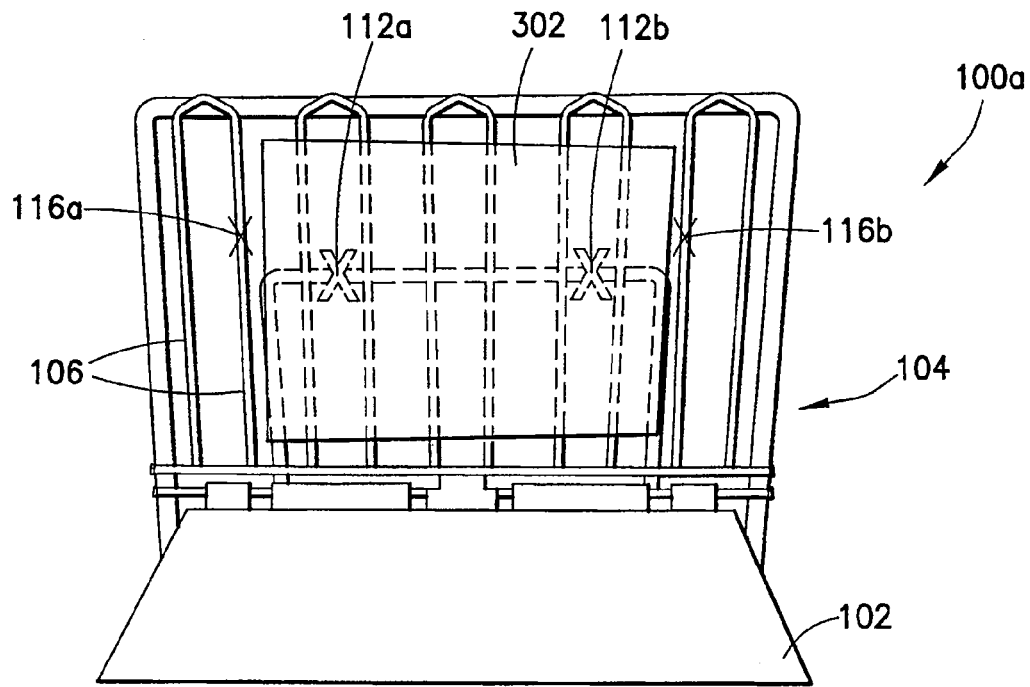
FIG. 3 shows an example prior art ad sign connected to the seat back of the child seat illustrated by FIG. 1A and further shows the ad sign concealing designated safety strap attachment points for the child seat.
Figure 4A:
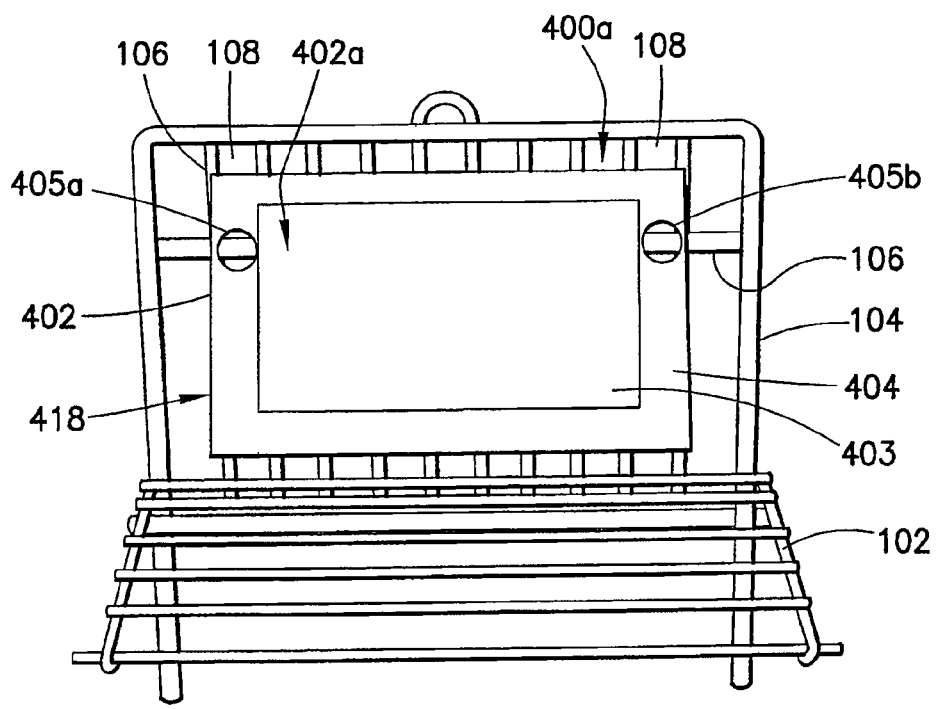
FIG. 4A shows an example ad sign according to the present invention, the ad sign including a content display area and safety strap openings that allow a safety strap to be secured to a shopping cart child seat.

Referring to FIG. 4A, there is illustrated example ad sign 400a according to an example embodiment of the invention, ad sign 400a being shown connected to the front face of a seat back 104 of an example shopping cart child seat. Note that for description purposes, embodiments of the present invention will be described and illustrated using child seats formed from interconnected bars/rails 106, as shown in FIG. 4A, for example. Nonetheless, one skilled in the art will recognize that ad signs of the present invention can also be used with other styles of child seats, such as child seats formed from molded plastic as illustrated in FIG. 1B, for example. In addition, while embodiments of the invention are illustrated with specific styles of bar/rail type child seats, one skilled in the art will recognize that ad signs of the present invention are applicable to other styles of child seats. Note also that for description purposes, embodiments of the present invention will generally be described and illustrated with respect to safety straps 200a and 200b as shown in FIGS. 2A and 2E, for example. Nonetheless, one skilled in the art will recognize that other styles/types of safety straps exist and can be used with ad signs of the present invention in similar ways as described below.

Returning to FIG. 4A, ad sign 400a includes a frame body 402 with a content display area 403, a frame/frame area 404, a frame attachment mechanism (not shown in FIG. 4A), and one or more safety strap openings, such as safety strap openings 405a and 405b. Frame body 402 is preferably substantially planar with a front side 402a and back side 402b (back side 402b being against the front face of seat back 104 in FIG. 4A). The frame body may have a rectangular or square shape, for example, although this shape is not required and other shapes may be used. The frame body preferably has a size such that when the frame body/ad sign is attached to seat back 104, the frame body/ad sign substantially resides within the perimeter/foot-print of the seat back. Nonetheless, the frame body/ad sign is not restricted to this size and may also extend beyond the perimeter/foot-print of the seat back.

Content display area 403 is situated on the front side 402a of frame body 402 and displays information content to an operator of the shopping cart. Frame/frame area 404 partially or totally surrounds, for example, content display area 403. The frame attachment mechanism is situated on the back side 402b or along the outer peripheral edge 418 of frame body 402, for example, and secures frame body 402 along the front face, for example, of seat back 104, as further described below. The one or more safety strap openings 405a and 405b are formed within frame body 402 and frame/frame area 404 and extend from the front side 402a to the back side 402b of frame body 402. According to an example embodiment of the invention, safety strap openings 405a and 405b allow a safety strap to be suitably attached to the child seat. In general, frame body 402 and frame/frame area 404 may be made from any suitable material known in the art, such as plastic, cardboard, rigid paper, metal, wood or any combination thereof.

In an example use of ad sign 400a according to an example embodiment of the invention, back side 402b of frame body 402 is placed against the front face of seat back 104, for example, as shown in FIG. 4A, and attached to the seat back using any suitable frame attachment mechanism. Information content is displayed in content display area 403 such that the information is viewable to an operator of the shopping cart, for example. The information content may be permanently affixed to ad sign 400a, be of a removable/replaceable form, or a combination thereof. If the information content is of a removable/replaceable form, the information content may be placed in content display area 403 either before or after attaching the frame body to the seat back.

According to an example embodiment of the invention, safety strap openings 405a and 405b are positioned within frame body 402/frame area 404 so that when frame body 402 is mounted to seat back 104, the strap openings expose and/or allow access to points on the seat back, such as one or more horizontal and/or vertical bars 106, for example. The exposed points on the seat back may or may not be the designated attachment points for the child seat, as further described below.

In an example use of ad sign 400a according to an example embodiment of the invention, once frame body 402 is attached to seat back 104, a safety strap is passed through strap openings 405a and 405b and secured to the seat back. For example, if the safety strap resembles strap 200a, fasteners 206 may be inserted through openings 405a and 405b and connected to bars on seat back 104, like bars 106, such that buckle 204 resides in the front of the child seat. Alternatively, if the safety strap resembles strap 200b, for example, webbing 202 may be threaded through openings 405a and 405b and interleaved, for example, through one or more slots/openings 108 and/or around one or more bars of the seat back such that webbing 204 extends across seat back 104 and buckle 204 resides in the front of the child seat, for example. As such, an ad sign according to the present invention both displays information content to an operator of the shopping cart and also allows a child safety strap to be provided with and suitably connected to the child seat.

Figure 4B:
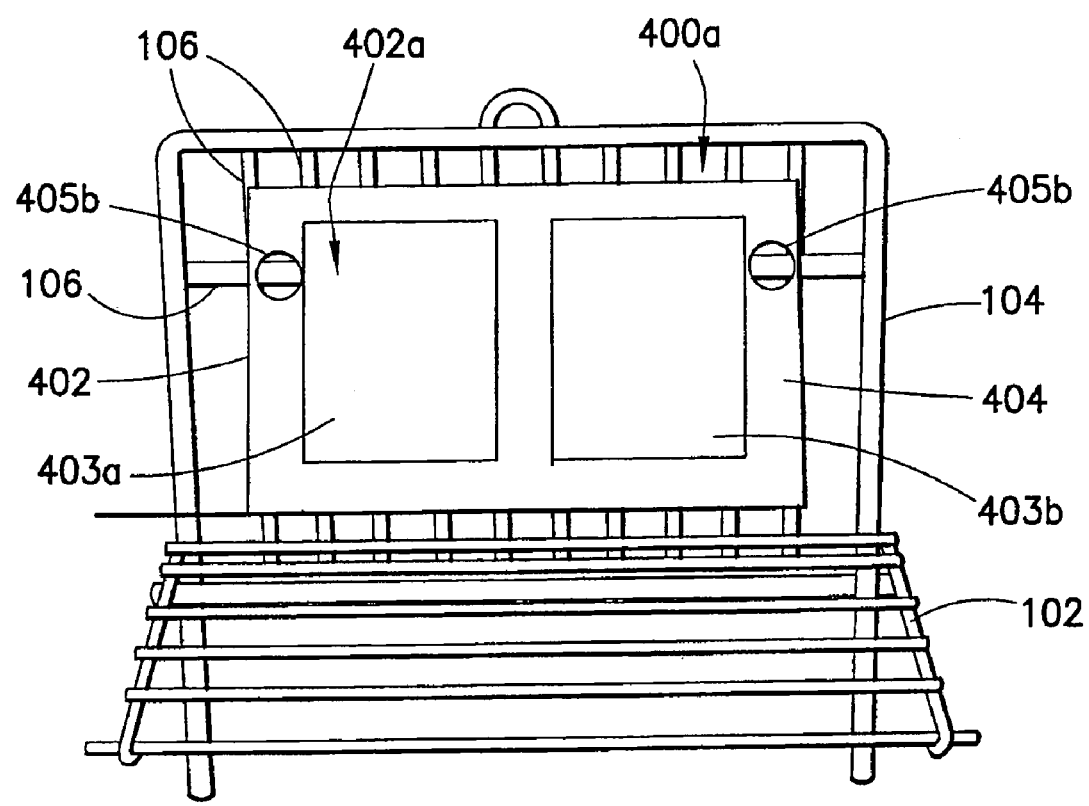
FIG. 4B shows an example ad sign similar to the ad sign illustrated by FIG. 4A, the ad sign including multiple content display areas.

Reference will now be made in greater detail to example ad sign 400a. Beginning with content display area 403, as indicated, this area displays information content. Content display area 403 may be a single continuous area or may be subdivided into a plurality (i.e., two or more) of areas. For example, as illustrated in FIG. 4B, frame area 404 may be shaped to sub-divide content display area 403 into two or more display areas 403a and 403b, each for displaying information content.

According to an example embodiment of the invention, content display area 403 may have a form such that information content may be permanently attached/affixed in this area. For example, content display area 403 may be a solid or substantially solid surface as shown in FIG. 4A. Here, information content may be directly printed or formed onto content display area 403, for example, and/or may be one or more metal, plastic, paper, or cardboard display cards, for example, that are permanently affixed in content display area 403. One skilled in the art will recognize that other arrangements may be used to attach/affix content permanently within area 403.

Alternatively, the information content may be in the form of one or more removable/replaceable display cards, for example, that are detachably retained within content display area 403 so that the information content of the display cards is viewable to an operator of the shopping cart, for example. The display cards may be made of cardboard, metal, paper, plastic, or any other suitable material known in the art.

As another alternative, content display area 403 may contain a combination of permanent information content and areas for receiving one or more replaceable display cards. For example, content display area 403 may contain grocery store items in permanent form and may also contain areas for receiving one or more replaceable display cards that designate isles in which the grocery items can be found. When content display area 403 allows for removable/replaceable display cards, the display cards may be placed into content display area 403 before frame body 402 is attached to the seat back and/or after the frame body is attached to the seatback.

When content display area 403 is of a form to receive replaceable display cards, any suitable mechanism (hereinafter referred to as display card attachment mechanisms) known in the art may be used to detachably connect the display cards to this area. For example, content display area 403 may be a solid or partially solid surface. Here, Velcro (generically referred to as hook and pile or hook and loop fasteners) may be applied to the back side of a display card and to the front side 402a of content display area 403, for example, and thereby used to attach the display card within the content display area. Alternatively, a removable adhesive may be applied to the front side of content display area 403 to retain a display card therein.

Figure 4C:
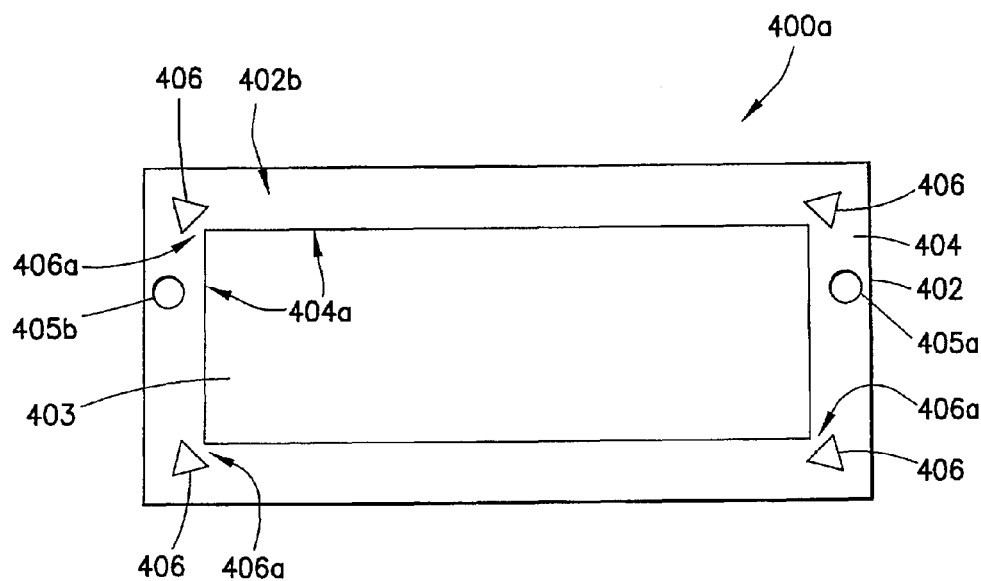
FIGS. 4C, 4D, 4E, and 4F show example mechanisms for retaining replaceable display cards within a content display area of an ad sign according to the present invention.
Figure 4D:
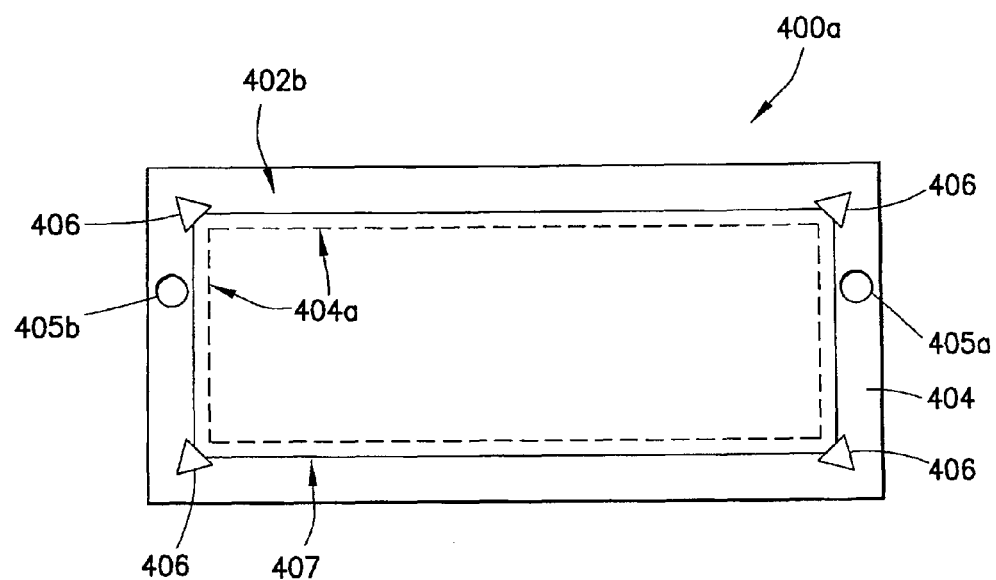

As another example, clips may be used to retain a display card within the display area. For example, referring to FIG. 4C, there is shown back side 402b of frame body 402. Here, content display area 403 may be an open window, for example. Clips 406 may be situated along the inner perimeter 404a of frame area 404, for example, to retain a display card. Clips 406 may be integral with frame body 402 and may be raised above the surface of the frame area, for example, thereby forming gaps along regions 406a. Alternatively, clips 406 may be metal spring clips, for example As illustrated in FIG. 4D, a display card 407, for example, may be placed over display area/open window 403 such that the contents of the display card are viewable from the front side 402a (not shown in the Figure) of frame body 402. Here, display card 407 may have a size such that the peripheral edge of the card extends beyond the perimeter 404a of frame area 404. In this way, the corners of display card 407, for example, may be inserted into the gaps along regions 406a of clips 406 and retained therein.

Figure 4E:
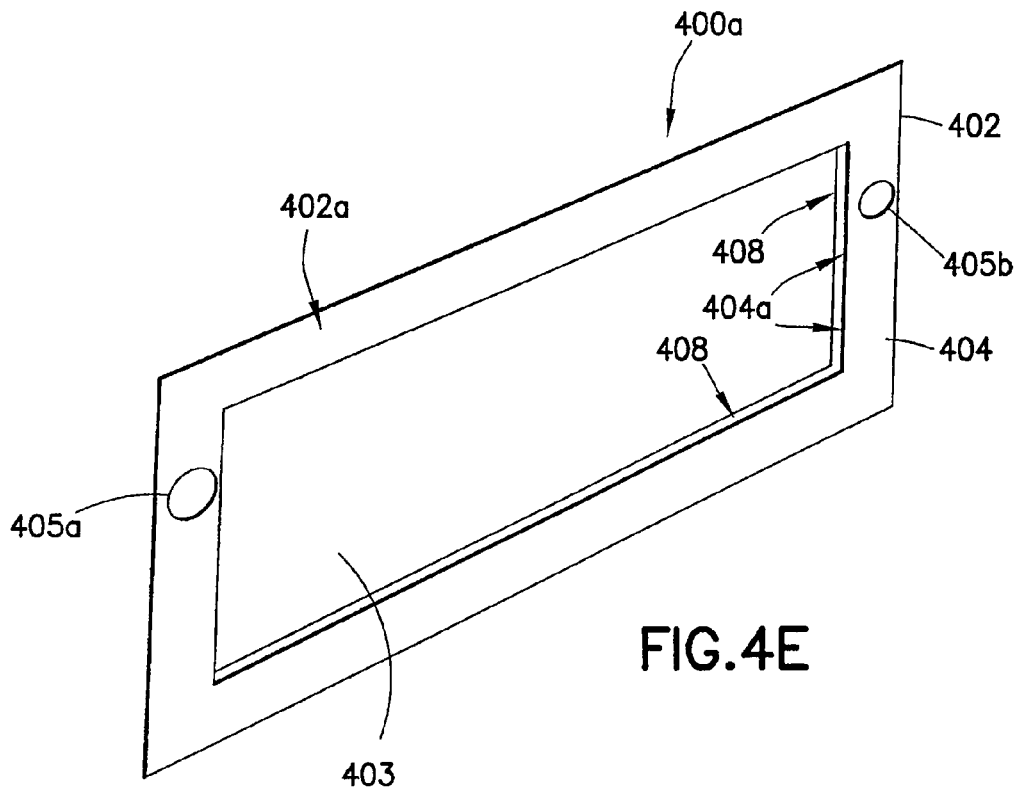

Referring to FIG. 4E, which shows the front side 402a of frame body 402, there is illustrated another example mechanism for retaining a display card within content display area 403. Here, content display area may be a solid or substantially solid surface (at least around the inner perimeter 404a of the frame area) for example, and frame area 404 may be raised above the surface of the content display area, thereby forming a gap or rim 408, for example. The display card may have a size such that once the card is placed within content display area 403, the peripheral edge of the card extends beyond the perimeter 404a of frame area 404 and into gap 408 such that the card is retained therein.

Figure 4F:
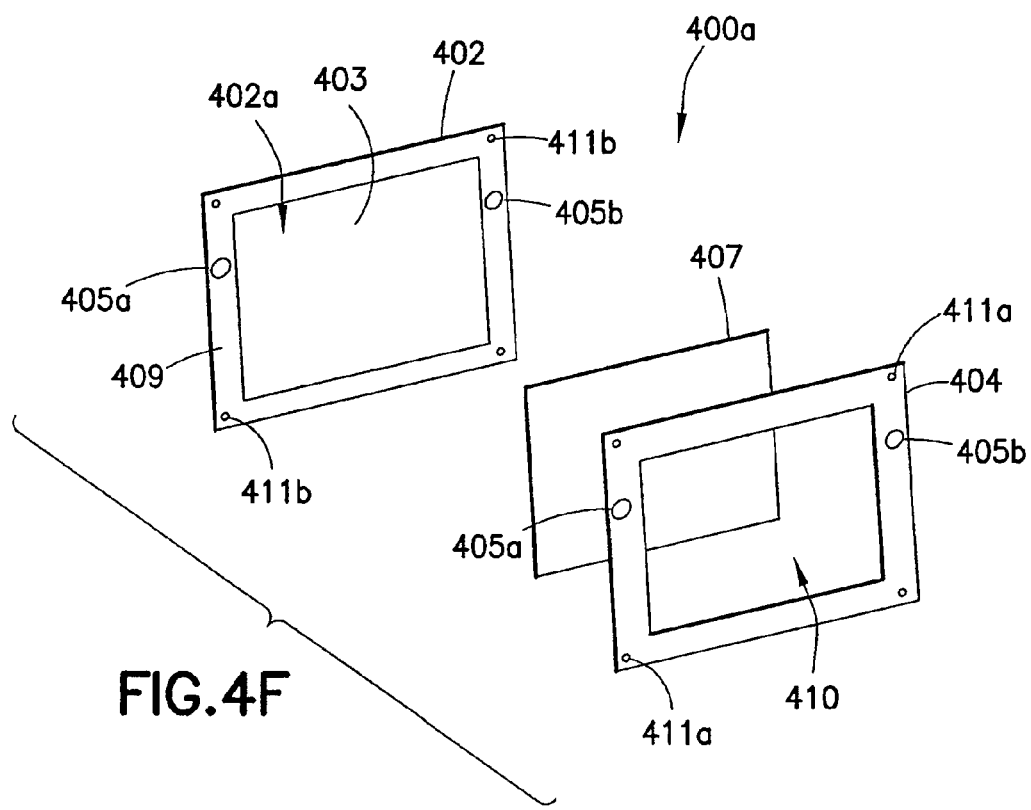

Referring to FIG. 4F, which shows the front side 402a of frame body 402, there is illustrated a further example mechanism for retaining a display card within content display area 403. According to this example attachment mechanism, the ad sign includes a frame 404 that is separate from frame body 402. Here, front side 402a of frame body 402 has a frame receiving area 409 surrounding content display area 403, which may or may not be a solid or substantially solid surface. Frame 404 defines a display window 410 and preferably has a size and shape that corresponds to frame receiving area 409.

In operation, display card 407, for example, may be placed within content display area 403 and may have a size such that the peripheral edge of the card extends into frame receiving area 409, for example. Frame 404 is thereafter positioned over frame receiving area 409 and attached thereto so that the contents of display card 407 show through display window 410. In general, any suitable mechanism known in the art may be used to attach frame 404 to frame receiving area 409. For example, frame 404 and frame body 402 may have a corresponding set of screw holes 411a and 411b, thereby allowing screws to secure the frame to the frame body. Alternatively, the surface of frame receiving area 409 and the back surface of frame 404 may have a corresponding set of male-female clips. Note that as illustrated in FIG. 4F, both frame 404 and frame body 402 may have corresponding safety strap openings 405a and 405b.

Again, the above described mechanisms for securing a replaceable display card within content display area 403 are examples and one skilled in the art will recognize that other suitable mechanisms known in the art may be used. Similarly, while the above examples show a single display card within content display area 403, forms of the above mechanisms, and other suitable mechanisms known in the art, may be used to attach multiple display cards to ad sign 400a. As also described above, information content may be permanently formed or permanently attached to content display area 403, in which case, ad sign 400a may not include a display card attachment mechanism. Furthermore, ad sign 400a may include both permanently affixed information content and may also include attachment mechanisms for receiving one or more replaceable display cards.

Figure 4G:
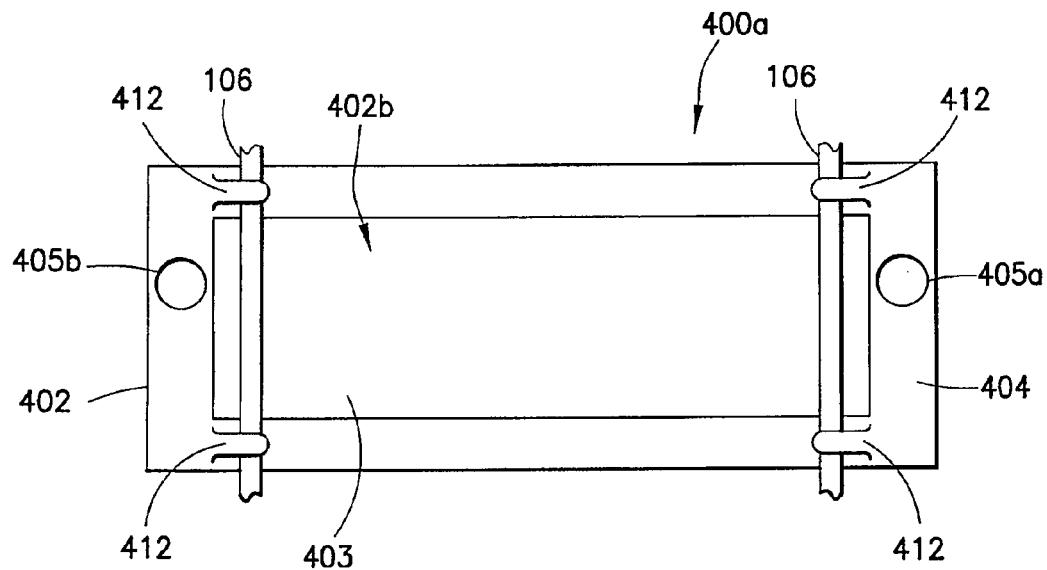
FIGS. 4G, 4H, and 4I show example mechanisms for attaching an ad sign of the present invention to a seat back of a shopping cart child seat.

Referring now to the frame attachment mechanism, as indicated, this mechanism secures frame body 402 to seat back 104. According to an example embodiment of the invention, the frame attachment mechanism simply secures frame body 402 to the seat back. In general, any suitable mechanism known in the art for securing the frame body in this fashion may be used. For example, referring to FIG. 4G, there is illustrated backside 402b of frame body 402. Situated at one or more points are hook-like brackets or clips 412. Clips 412 may be integral with the frame body or may be attached to the frame body with an adhesive or screw, for example. As illustrated in FIG. 4G, clips 412 may extend off the surface of frame body 402 and clip around bars/rails 106, for example, of seat back 104 (note that only two rods of the seat back are illustrated in FIG. 4G).

Figure 4H:
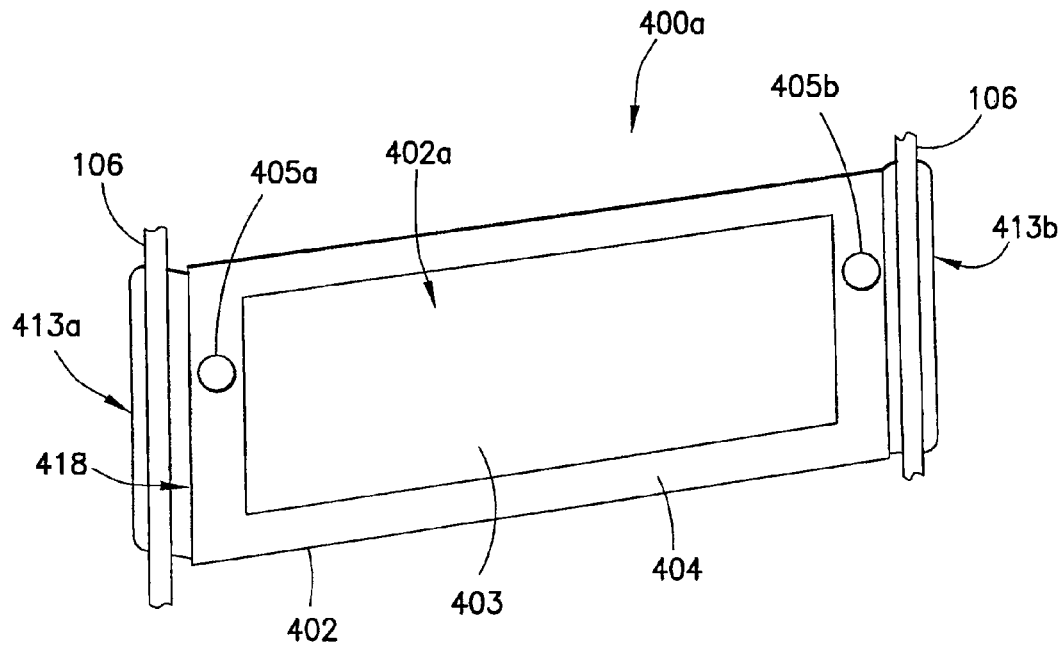

Alternatively, as illustrated in FIG. 4H, which shows front side 402a of frame body 402, the frame body may be extended to include one or more tabs 413a and 413b that extend outward from the sides/edges 418, for example, of the frame body. As illustrated in FIG. 4H, tabs 413a/b engage rods 106, for example, of seat back 104 (note that only two rods of the child seat back are illustrated in FIG. 4H). According to an example embodiment of the invention, the safety strap opening(s), such as openings 405a and 405b, may reside within frame area 404, may reside within both frame area 404 and tabs 413a and 413b, or may totally reside within tabs 413a and 413b, for example.

According to another example embodiment of the invention, the frame attachment mechanism may not only secure frame body 402 to seat back 104 but may also prevent the frame body from horizontally or vertically sliding, for example, along bars 106, for example, of seat back 104. Any suitable mechanism known in the art for securing the frame body in this fashion may be used. For example, referring to FIG. 4I, which shows backside 402b of frame body 402, the frame body may include a plurality of pressure clamps 414.

Figure 4I:
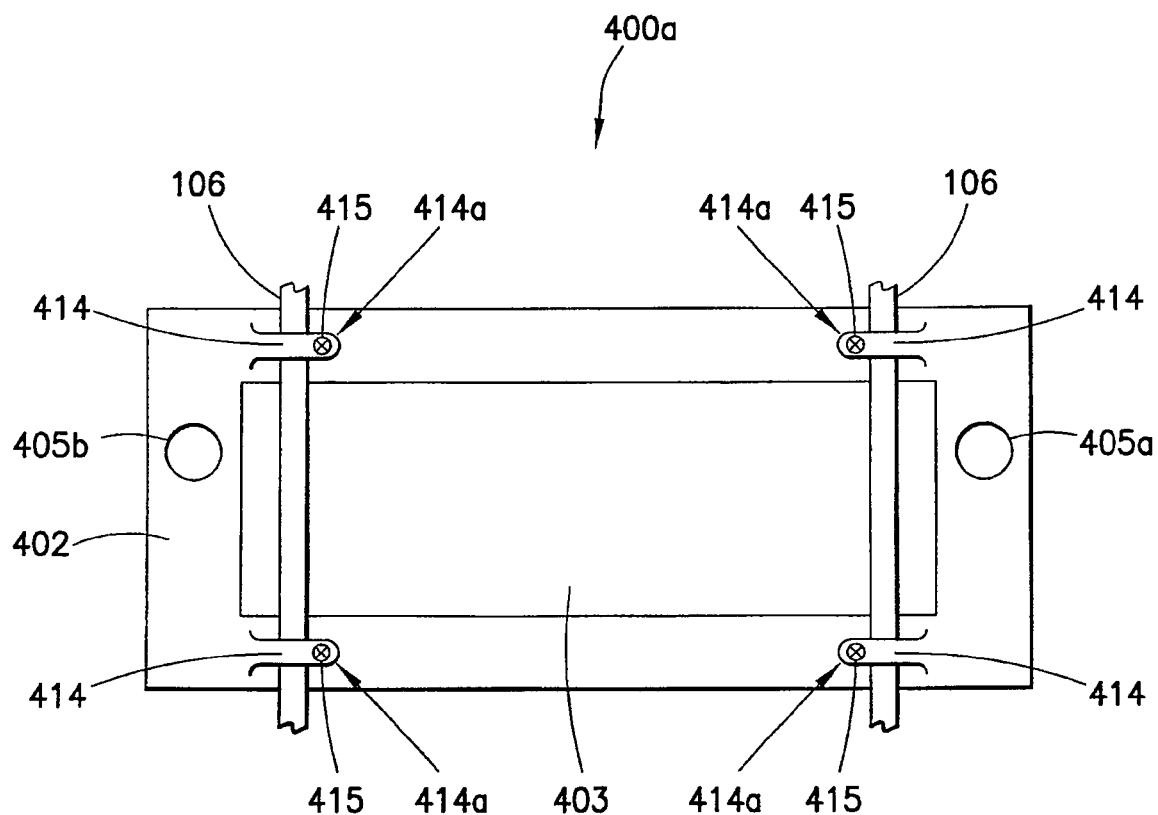

Similar to clips 412, pressure clamps 414 may be integral with frame body 402, for example, and extend off the surface of the frame body and clip around bars/rails 106, for example, of seat back 104 (note that only two rods of the seat back are illustrated in FIG. 4I). Here, each pressure clamp 414 may include a screw 415, for example, at free end 414*a* of the clamp such that the free end can be screwed down to the frame body. In this way, each clamp firmly grasps bar 106 and prevents movement along the bar.

Figure 4J:
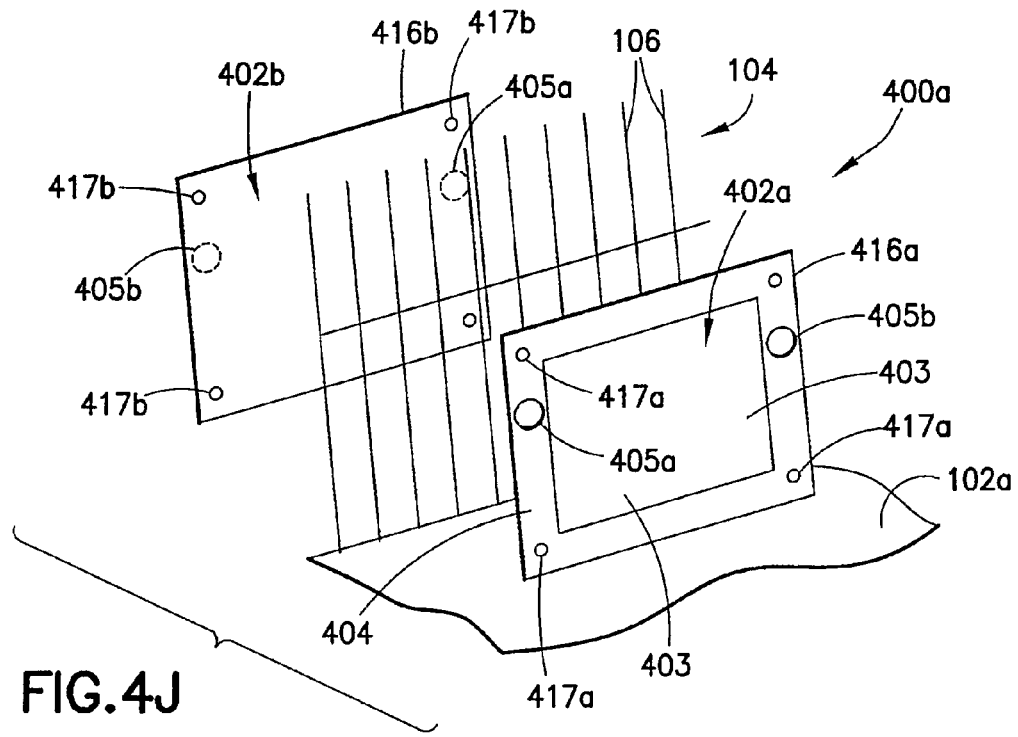
FIG. 4J shows an example ad sign according to the present invention, the ad sign including two frame bodies to be attached to opposing sides of a seat back of a shopping cart child seat.

Referring to FIG. 4J, there is illustrated another example frame attachment mechanism. According to this example, ad sign 400*a* comprises two frame bodies 416*a* and 416*b*. Each frame body may resemble, for example, frame body 402 as shown in any of FIGS. 4A-4F. Here, back side 402*b* of frame body 416*a* is placed against the front face of seatback 104 such that the information content in content display area 403 is visible to an operator of the cart. Similarly, the backside of 402*b* of frame body 416*b* is placed against the back face of seat back 104 such that information content in content display area 403 (assuming this frame body is configured to display information) is visible from the backside of the shopping cart. In this fashion, seat back 104 is sandwiched between the two frame bodies 416*a* and 416*b*. Thereafter, the two frame bodies may each be secured to the seat back and/or may be secured to each other using fasteners, such as screws, for example. Specifically, frame bodies 416*a* and 416*b* may have a corresponding set of screw holes 417*a* and 417*b*, thereby allowing screws to secure the two frame bodies together and to clamp seat back 104 there between. As illustrated in FIG. 4J, frame bodies 416*a* and 416*b* may both include safety strap openings 405*a* and 405*b*, for example, but these openings are not required in frame body 416*b*, for example.

Again, the above described mechanisms for securing frame body 402 to the seat back of a child seat are examples and one skilled in the art will recognize that any suitable mechanism known in the art may be used.

Referring again to FIG. 4A, and similarly to FIGS. 4B-4J, reference will now be made to safety strap openings 405*a* and 405*b*. As indicated above, according to an example embodiment of the invention once frame body 402 is mounted to seat back 104, the safety strap openings provide access to the seat back and allow a child safety strap to be attached to the seat back. In particular, according to an example embodiment of the invention, safety strap openings 405*a* and 405*b* may be configured and positioned along frame body 402/frame area 404 such that when frame body 402 is secured to seat back 104, safety strap openings 405*a* and 405*b* expose/provide access to the designated safety strap attachment points on the seat back that the ad sign would otherwise conceal. As such, a safety strap may be connected to the seat back in the normal manner. For example, when using a safety strap like strap 200*a*, for example, each fastener 206 of the safety strap may be inserted through one of the safety strap openings 405*a* and 405*b* and connected to the bars of the seat back at the designated attachment points such that buckle 204 (assuming the strap includes a buckle) resides in the front of the child seat, as partially illustrated in FIG. 4K, for example. Here, fastener 206 of safety strap 200*a* is connected to horizontal bar 106*b*, for example, and is prevented from making large horizontal or vertical movements by bars 106*a* and 106*b*, for example, in the normal manner. Here, fasteners 206 may be detachably and/or permanently connected to seat back 104.

Alternatively, when using a safety strap like strap 200*b*, for example, webbing 202 may be inserted through safety strap openings 405*a* and 405*b* and interleaved, for example, through one or more slots/openings 108 and/or around one or more bars of the seat back at the designated attachment points such that webbing 202 extends across seat back 104 and such that buckle 204 resides in the front of the child seat, thereby securing the strap to the seat back. Alternatively, strap 200*b* may be reversed such that buckle 204 resides in the back of the child seat and webbing 202 extends across the front of the child seat and around a child.

According to this example embodiment of the invention, any frame attachment mechanism known in the art, such as those described above, may be used to connect frame body 402 to seat back 104. In addition, safety strap openings 405*a* and 405*b* may have any suitable size and need only have sufficient size such that a fastener 206 and/or webbing 202, for example, can pass through and access seat back 104.

According to another example embodiment of the invention, safety strap openings 405*a* and 405*b* may be configured and positioned along frame body 402/frame area 404 such that when frame body 402 is secured to seat back 104, the safety strap openings expose or provide access to points on the seat back that are not designated/approved safety strap attachment points for the child seat. For example, referring to FIG. 4L, there is illustrated ad sign 400*a* connected to a seat back 104 that includes a plurality of vertical bars 106*a*. Safety strap openings 405*a* and 405*b* expose points 420*a* and 420*b* on the vertical bars that would normally (i.e., when no ad sign is present) not be suitable attachment points for a safety strap, such as straps 200*a* and 200*b*, because the fasteners 206 or webbing 202 of the strap would slide vertically when attached to these points, possibly allowing a child to slip free. According to an example embodiment of the invention, safety strap openings 405*a* and 405*b* of ad sign 400*a* now allow a safety strap be connected to the seat back at these points 420*a* and 420*b*, thereby establishing/forming suitable attachment points (hereinafter referred to as secondary suitable attachment points) along the vertical bars. In other words, the safety strap openings of the ad sign establish safety strap attachment points 420*a* and 420*b* on the seat back such that when a safety strap is inserted through the safety strap openings and attached to the seat back at these points, the strap meets occupancy retention performance requirements as defined by tests set forth by the child occupancy standards (e.g., pulling a dummy with 40 lbs of force or performing other tests as required by the standards).

For example, when using a safety strap like strap 200*a*, fasteners 206 of the safety strap may be inserted through the safety strap openings and connected to the exposed vertical bars 106*a* at points 420*a* and 420*b*, for example. Alternatively, when using a safety strap like strap 200*b*, for example, webbing 202 may be inserted through the safety strap openings 405*a* and 405*b* and interleaved between and/or around the exposed vertical bars 106*a*, for example, such that webbing 204 extends across seat back 104. According to this example embodiment of the invention, the outer perimeter edges/sides of safety strap openings 405*a* and 405*b* now act as positioning elements/guides, preventing the fasteners 206 or webbing 202 from sliding along vertical bars 106*a*, for example, and thereby providing the secondary suitable attachment points for the safety strap.

As such, according to this example embodiment of the invention, safety strap openings 405*a* and 405*b* preferably have a suitable size that limits the movement of the fasteners/webbing along the bars of the seat back. In addition, frame body 402 preferably includes a frame attachment mechanism such that when the frame body is attached to seat back 104, the frame body does not move horizontally or vertically, for example. In this way, if the safety strap is pulled against the perimeter of safety strap openings 405*a* and 405*b*, for example, the strap will not cause ad sign 400*a* to slide.

Figure 4K:
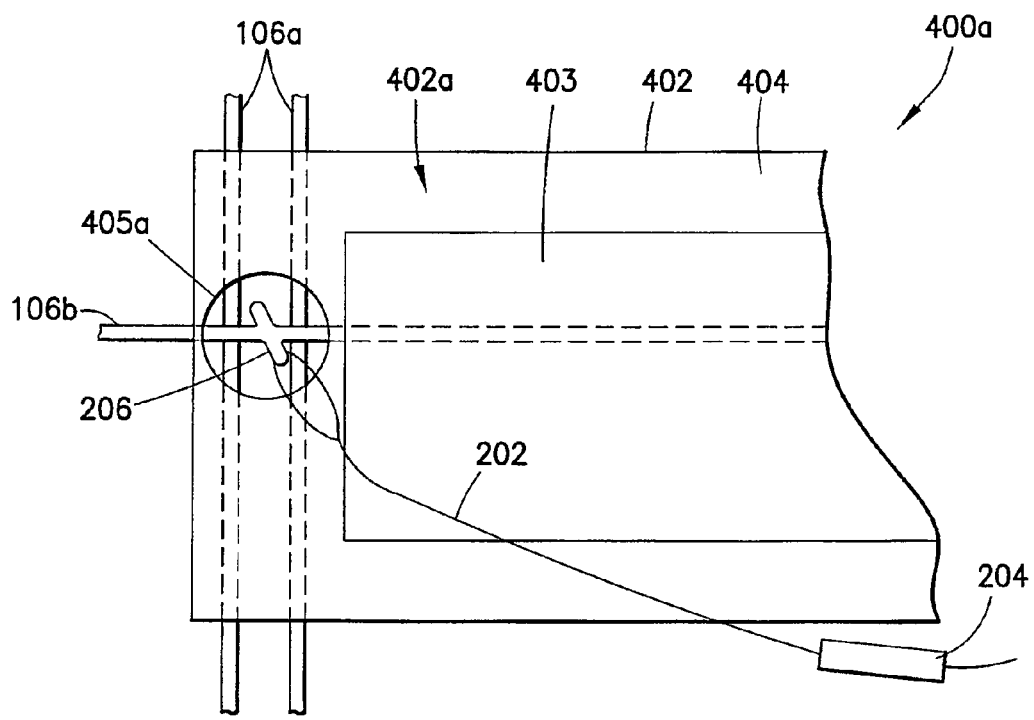
FIG. 4K shows an example arrangement according to the present invention for securing a safety strap and the ad sign illustrated by FIG. 4A to a shopping cart child seat.
Figure 4L:
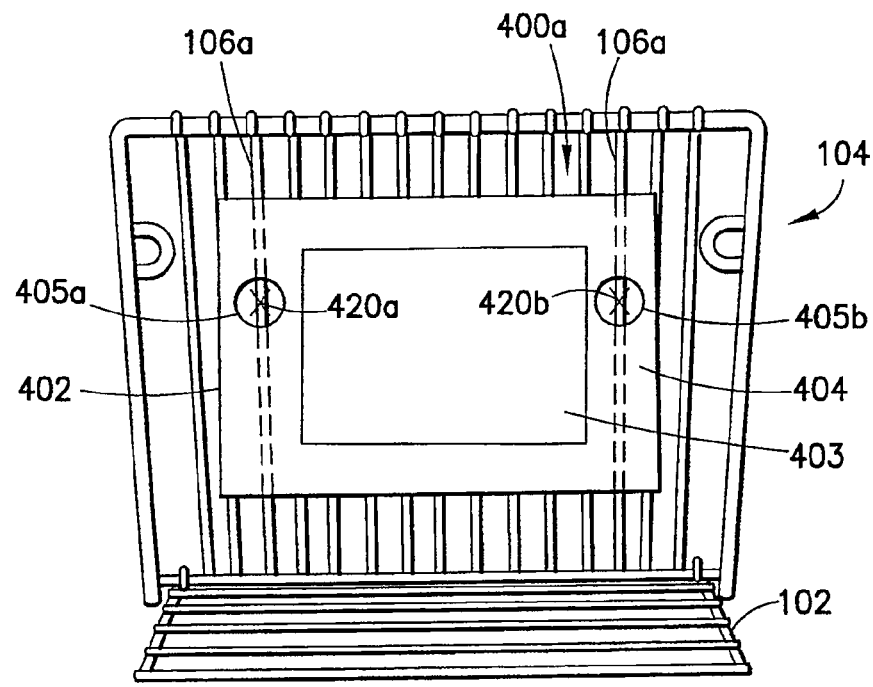
FIGS. 4L and 4M each shows an example ad sign according to the present invention, each ad sign including safety strap openings that allow a safety strap to be secured to a shopping cart child seat.
Figure 4M:
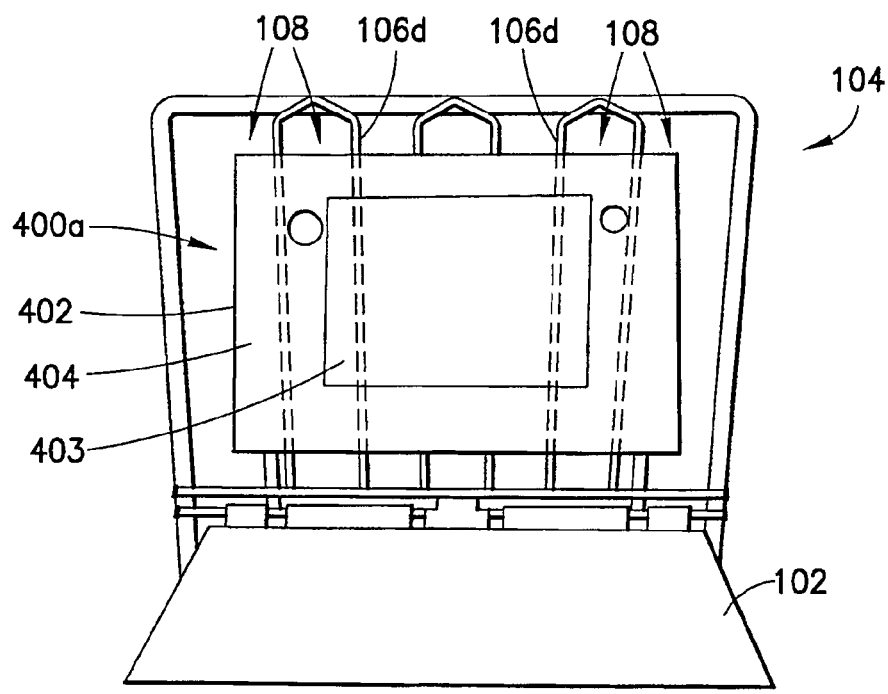

Referring now to FIG. 4M, according to another example embodiment of the invention, safety strap openings 405a and 405b may be configured and positioned along frame body 402/frame area 404 such that when frame body 402 is secured to seat back 104, the safety strap openings reside over the slots/openings 108 of seat back 104, for example. Similar to above, when safety strap openings 405a and 405b are configured in this fashion, the safety strap openings may act as positioning elements, thereby allowing the ad sign to provide secondary suitable attachment points for a safety strap. As such, the openings are preferably suitably sized and the ad sign is preferably secured to the seat back such that the sign does not easily slide along the seat back.

As an example, when using a safety strap like strap 200a with ad sign 400a as illustrated in FIG. 4M, fasteners 206 may be inserted through the safety strap openings 405a and 405b and connected to bars 106d, for example, behind the ad sign 400a. Similarly, when using a safety strap like strap 200b, webbing 202 may be inserted through the safety strap openings 405a and 405b and extended across the back face of the seat back and/or interleaved between and/or around the bars of the seat back, for example, thereby securing the strap to the seat back, as similarly described above.

According to another example embodiment of the invention, rather than inserting a safety strap through safety strap openings 405a and 405b and securing the strap only to seat back 104 as described above with reference to FIGS. 4K-4M, the safety strap may be inserted through the safety strap openings and secured only to the ad sign or may be inserted through the safety strap openings and secured to both the ad sign and the seat back. Here again, the ad sign may provide secondary suitable attachment points for a safety strap. For example, when using ad sign 400a with a safety strap like strap 200b, webbing 202 of the safety strap may be inserted through the safety strap openings 405a and 405b and extended between back side 402b of frame body 402 and the front face of seat back 104, thereby bypassing the seat back and only securing the safety strap to ad sign 400a. Here, ad sign 400a is preferably secured to the seat back such that the sign does not easily slide along or pull free from the seat back. According to this embodiment of the invention, the strap may simply extend across the back side 402b of the frame body or may be connected to/integral with the frame body. For example, the strap may pass through one or more fixed loops along the back side of the frame body (similar to a belt through belt loops) or may be secured to the frame body using any suitable mechanism known in the art such as Velcro, screws, nuts and bolts, grommets, rivets, or a co-molding or clamping process as is known in the art. As another alternative, in addition to securing the strap to the ad sign as just described, the strap may also be secured to the seat back by interleaving the strap between and/or around the bars of the seat back, for example, as described above.

Figure 4N:
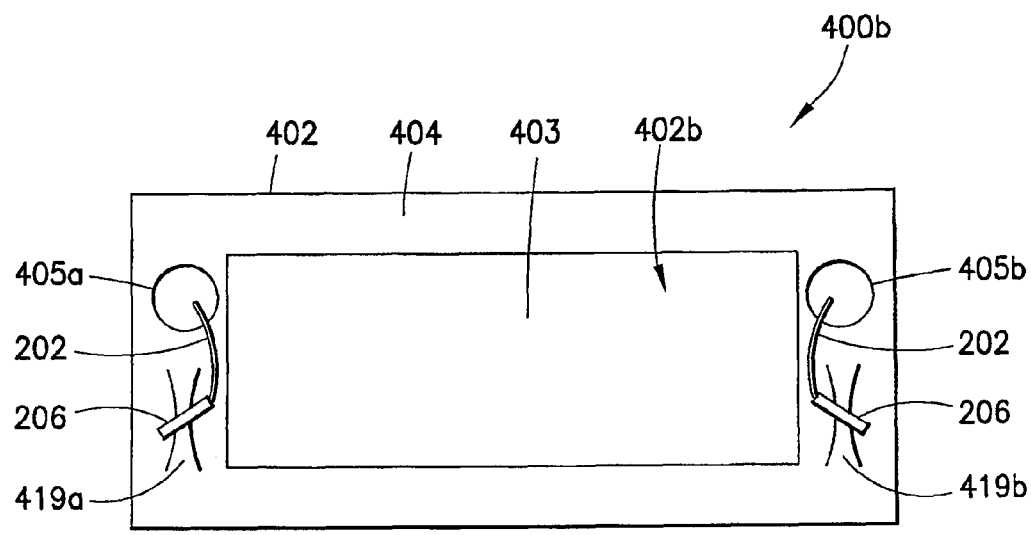
FIG. 4N shows an example ad sign according to the present invention, the ad sign including safety strap openings and safety strap anchors for securing a safety strap to a shopping cart child seat.

Referring now to FIG. 4N there is illustrated example ad sign 400b according to an example embodiment of the invention. Ad sign 400b includes one or more safety strap openings, such as openings 405a and 405b, and also includes one or more safety strap anchors, such as anchors 419a and 419b. Safety strap anchors 419a and 419b may be situated on back side 402b, for example, of the frame body and may be loops/hooks that are integral with/secured to the frame body and extend outward from the back side surface of the frame body. Through anchors 419a/419b, ad sign 400b allows a safety strap to be secured to only the ad sign or to both the ad sign and the seat back. For example, as illustrated in FIG. 4N, fasteners 206 of strap 200a, for example, may be inserted though respective safety strap openings 405a and 405b and attached to respective anchors 419a and 419b such that buckle 204 resides in the front of the child seat and such that the strap is secured only to the ad sign. Alternatively, one or both fasteners 206 may be attached to anchors 419a/419b and to bars 106 of the seat back (not shown in FIG. 4N) that may reside in close proximity to the anchors, thereby securing the strap to both the seat back and the ad sign. One skilled in the art will also recognize that other attachment variations/combinations are possible. For example, a first fastener 206 of the safety strap may be inserted through safety strap opening 405a and attached to the frame body through anchor 419a, for example, and a second fastener 206 of the safety strap may be inserted through safety strap opening 405b and attached only to a rod of the seat back, etc. Here, rather than using a buckle 204 to secure and remove a child from the strap/child seat, the second fastener 206, for example, may be detached from and connected to the seat back to secure and remove a child.

One skilled in the art will also recognize that example ad sign 400b is not limited to strap 200a and/or anchors 419a/419b. For example, rather than having fasteners 206, each end of the strap may be inserted through a respective safety strap opening 405a and 405b and detachably attached and/or permanently attached to a respective anchor 419a/419b by looping an end of the strap (i.e., webbing 202) through an anchor and re-attaching the strap upon itself using, for example, Velcro, grommets, rivets, stitching, etc. Similarly, rather than anchors 419a/419b, each end of the strap may be inserted through a respective safety strap opening 405a and 405b and detachably attached and/or permanently attached directly to frame body 402 using any suitable mechanism known in the art, such as Velcro, screws, nuts and bolts, grommets, rivets, co-molding, or a clamping process, for example. Again, one skilled in the art will recognize that various combinations of securing the safety strap to the ad sign and/or seat back are possible.

Figure 4O:
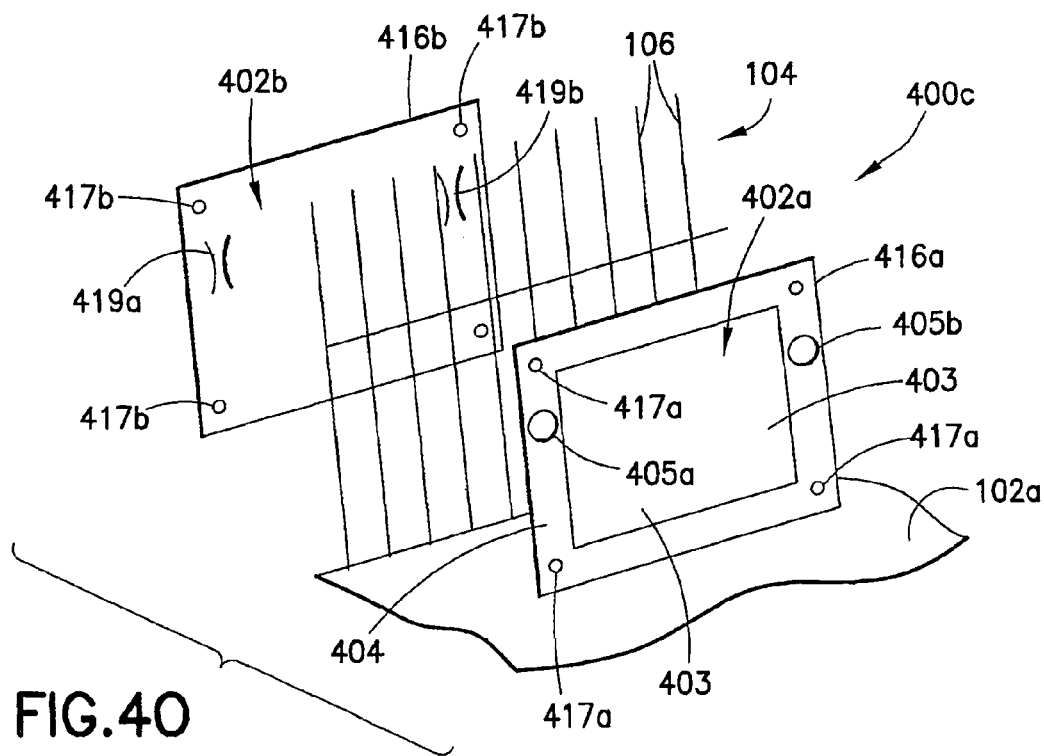
FIG. 4O shows an example ad sign according to the present invention, the ad sign including two frame bodies, one with safety strap openings and the other with safety strap anchors for securing a safety strap to a shopping cart child seat.

Referring now to FIG. 4O, there is illustrated example ad sign 400c according to an example embodiment of the invention. Ad sign 400c include two frame bodies 416a/416b, similar to the ad sign illustrated in FIG. 4J, and again, allows a safety strap to be secured to only the ad sign or to both the ad sign and the seat back. Here, frame body 416a is secured to the front face of the seat back and may include one or more safety strap openings, such as openings 405a and 405b. Frame body 416b is secured to the back face of the seat back and may include on its back side 402b, for example, one or more safety strap anchors, such as anchors 419a and 419b, which may be similar to the safety strap anchors of ad sign 400b, for example (note that according to this embodiment of the invention, frame body 416b may or may not include a content display area on the front side thereof for displaying information content). Here, fasteners 206 of strap 200a, for example, may be inserted through respective openings 405a and 405b of the front fame body 416a and may be detachably attached and/or permanently attached to respective anchors 419a and 419b of the rear frame body 416b, thereby connecting the strap only to the ad sign. Alternatively, one or both fasteners 206 may be attached to respective anchors 419a/419b and also to bars 106 of the seat back that may reside in close proximity to the anchors, thereby connecting the strap to both the ad sign and seat back. Again, one skilled in the art will recognize that other attachment variations are possible, including, for example, connecting one end of the strap to the rear frame body as just described and the other end of the strap to only a bar of the seat back. One skilled in the art also will recognize that other detachable and/or permanent safety strap attachment mechanisms for securing a safety to the rear frame body 416b may be used, as similarly described for ad sign 400b.

In general, note that while safety strap openings 405a and 405b of example ad signs 400a, 400b, and 400c are illustrated as being circular in shape, any suitably shaped openings, such as slots, may be used. As illustrated in the Figures, openings 405a and 405b are positioned horizontally adjacent from each other. Again, this positioning is not required. In addition, while the Figures illustrate openings 405a and 405b as being positioned at similar locations along opposing sides of frame body 402/frame area 104, this positioning is not required. Furthermore, while openings 405a and 405b are illustrated as being situated along the sides of frame body 402/frame area 104, the openings may be positioned along the top or bottom sides of the frame body, for example.

Figure 4P:
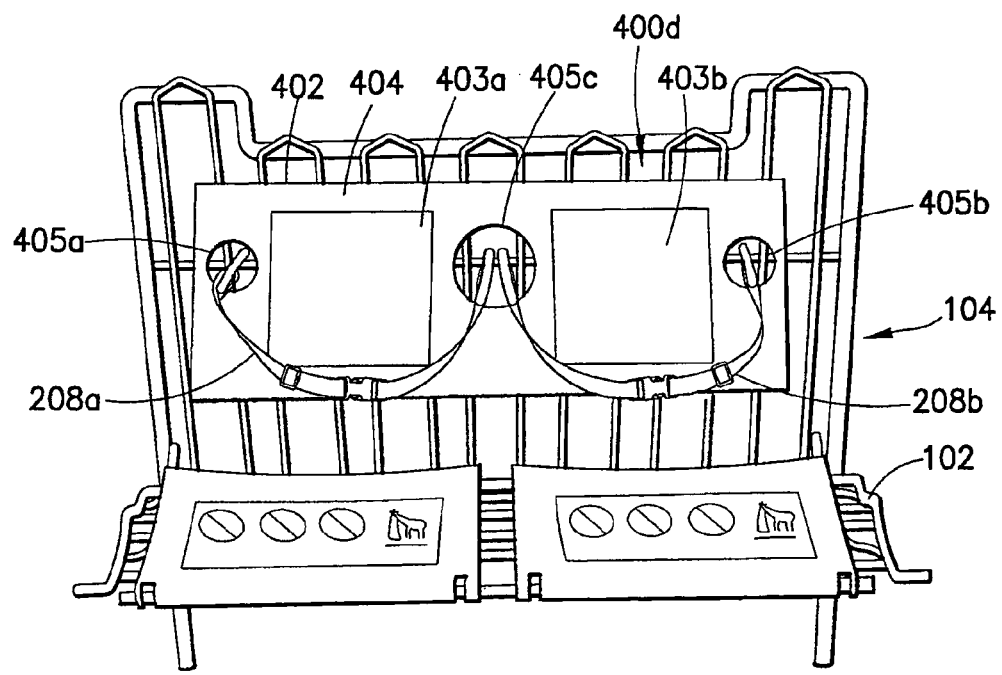
FIG. 4P shows an example ad sign according to the present invention and an example arrangement for securing two safety straps to a shopping cart child seat to retain two children.
Figure 4Q:
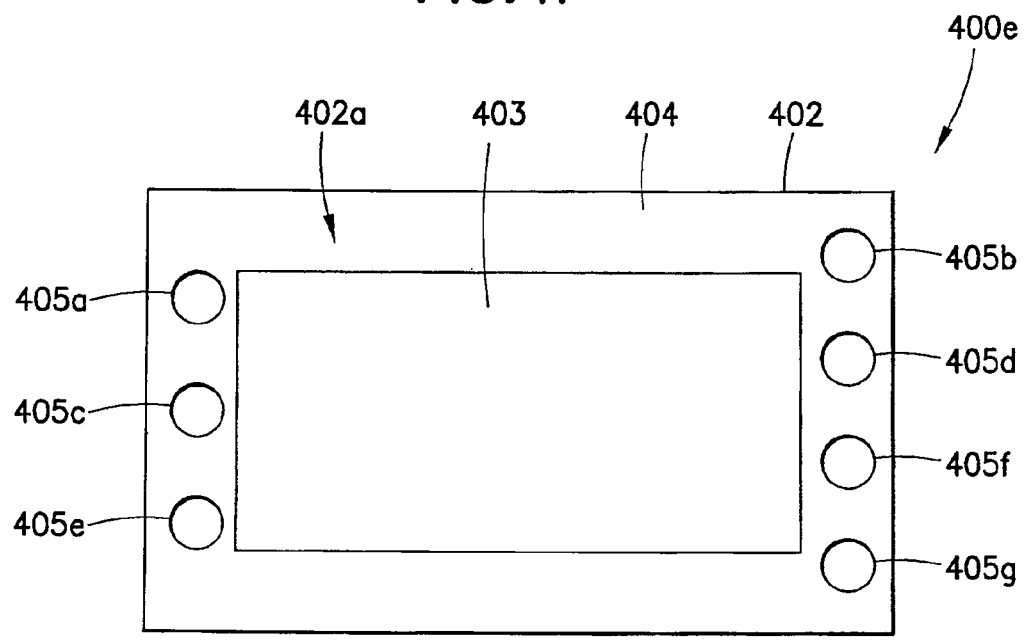
FIG. 4Q shows an example ad sign according to the present invention, the ad sign including a plurality of safety strap openings.

Note that ad signs 400a, 400b, and 400c are also not limited to two safety strap openings and may include, for example, one opening as indicated above, or more than two openings. For example, an ad sign with a single opening may be useful for off-shaped or small ad signs that only conceal one attachment point on the child seat, for example. Referring to FIG. 4P there is illustrated example ad sign 400d according to an example embodiment of the invention. Ad sign 400d includes three safety strap openings 405a, 405b, and 405c. As illustrated, ad sign 400d may be useful, for example, for child seats that hold two children and thereby require two safety straps, such as straps 208a and 208b. Similarly, referring to FIG. 4Q, there is illustrated example ad sign 400e according to an example embodiment of the invention. Ad sign 400e includes a plurality safety strap openings 405a-g and may be useful for accommodating numerous different styles of child seats, for example. In addition, note that the safety strap openings of the present invention do not need to be positioned as pairs, as shown by opening 405g, for example.

Figure 5A:
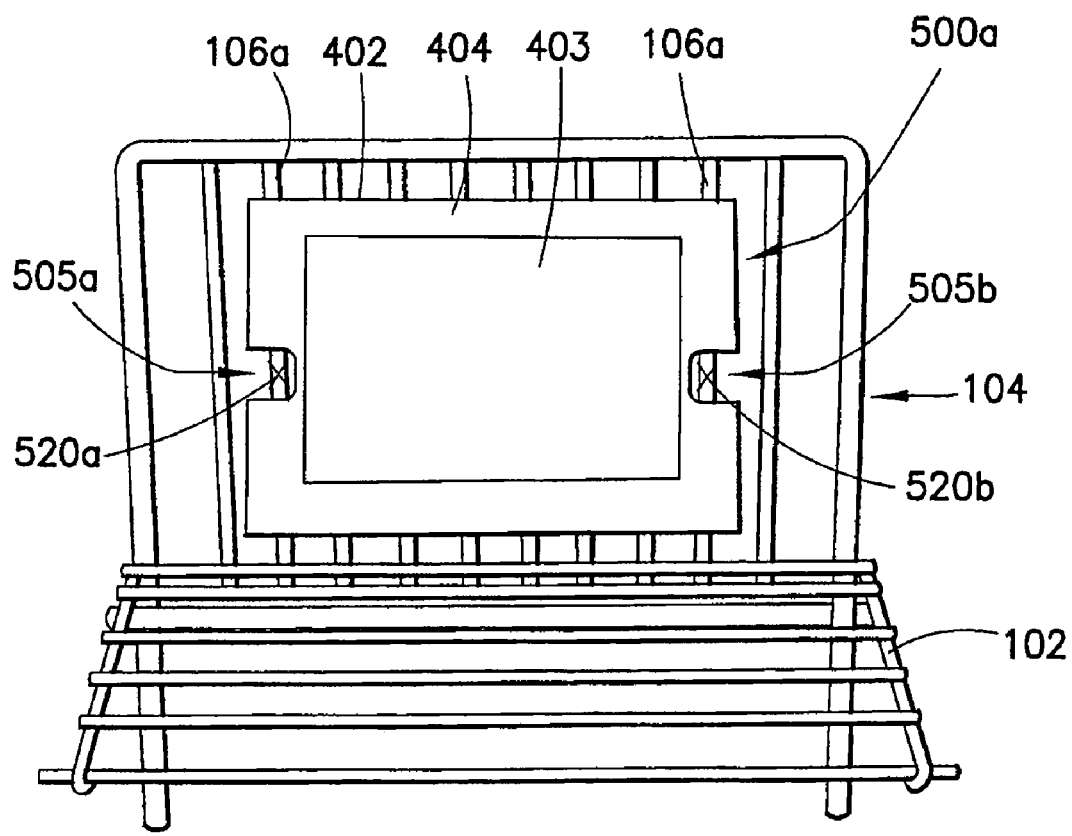
FIGS. 5A and 5B each shows an example ad sign according to the present invention, each ad sign including safety strap openings in the form of indentations for securing a safety strap to a shopping cart child seat.

Referring now to FIG. 5A, there is illustrated example ad sign 500a according to an example embodiment of the invention. Ad sign 500a is substantially similar to ad sign 400a, for example, and includes a frame body 402 with a content display area 403, a frame/frame area 404, and a frame attachment mechanism, as similarly described above. Ad sign 500a also includes one or more safety strap openings, such as openings 505a and 505b, formed within frame body 402 and frame/frame area 404. As illustrated in FIG. 5A, according to this embodiment of the invention, the safety strap openings 505a and 505b are now formed as indentations within frame body 402 and frame area 404. These openings/indentations may extend from the front side 402a to the back side 402b of frame body 402 and may extend from the perimeter of the frame body inward towards the content display area, for example. Notably, if frame body 402 of ad sign 500a is extended to include tabs 413a and 413b as an attachment mechanism (as illustrated in FIG. 4H for example), safety strap openings 505a and 505b may reside within frame area 404, within tabs 413a and 413b, or within both frame area 404 and tabs 413a and 413b, for example. Similarly, if ad sign 500a is of a form as illustrated in FIG. 4J, for example, and includes two frame bodies, each frame body may include safety strap openings 505a and 505b.

According to an example embodiment of the invention, safety strap openings 505a and 505b may be configured and positioned along frame body 402/frame area 404 such that when frame body 402 is secured to seat back 104, safety strap openings 505a and 505b expose or provide access to the designated safety strap attachment points on the seat back, as similarly described and shown for ad sign 400a in FIG. 4K, for example. Accordingly, when using a safety strap like strap 200a, for example, each fastener 206 of the safety strap may be inserted through one of the safety strap openings 505a and 505b and detachably attached and/or permanently attached to the bars of the seat back at the designated attachment points. Similarly, when using a safety strap like strap 200b, for example, webbing 202 may be inserted through safety strap openings 505a and 505b and interleaved, for example, through one or more slots/openings and/or around one or more bars of the seat back at the designated attachment points such that webbing 204 extends across seat back 104 and such that buckle 204 resides in the front of the child seat, thereby securing the strap to the seat back. Alternatively, the strap may be reversed, as similarly described above, with the buckle 204 residing at the back side of the seat back.

According to this example embodiment of the invention, any attachment mechanism known in the art, such as those described above, may be used to connect frame body 402 to the seat back. In addition, safety strap openings 505a and 505b may have any suitable size and need only have sufficient size such that fasteners 206 and/or webbing 202, for example, can pass through and access seat back 104.

Referring to FIG. 5A, according to another example embodiment of the invention, safety strap openings 505a and 505b may be configured and positioned along frame body 402/frame area 404 such that when frame body 402 is secured to seat back 104, the openings establish secondary suitable attachment points on the seat back, as similarly described and shown for ad sign 400a in FIG. 4L. For example, as shown in FIG. 5A, safety strap openings 505a and 505b are positioned over points 520a and 520b along vertical bars 106a, for example, which points are not designated/approved safety strap attachment points for the child seat. According to an embodiment of the invention, ad sign 500a now allows a safety strap to be attached to these points.

For example, as similarly described for ad sign 400a, when using a safety strap like strap 200a, each fastener 206 may be inserted through safety strap openings 505a and 505b and connected to the exposed vertical bars 106a at points 520a and 520b. Alternatively, when using a safety strap like strap 200b, for example, webbing 202 may be inserted through safety strap openings 505a and 505b and interleaved, for example, through one or more slots/openings and/or around one or more bars of seat back 104 and across the seat back. As similarly describe above, according to this example embodiment of the invention, the outer perimeter edges/sides of safety strap openings 505a and 505b now act as positioning elements that prevent the fasteners 206 or webbing 202 from sliding along the bars, thereby establishing the secondary suitable attachment points. Accordingly, safety strap openings 505a and 505b preferably have a suitable size to limit the movement of the fasteners/webbing. In addition, frame body 402 preferably includes a frame attachment mechanism such that when the frame body is attached to seat back 104, the frame body will not move horizontally or vertically, for example.

Figure 5B:
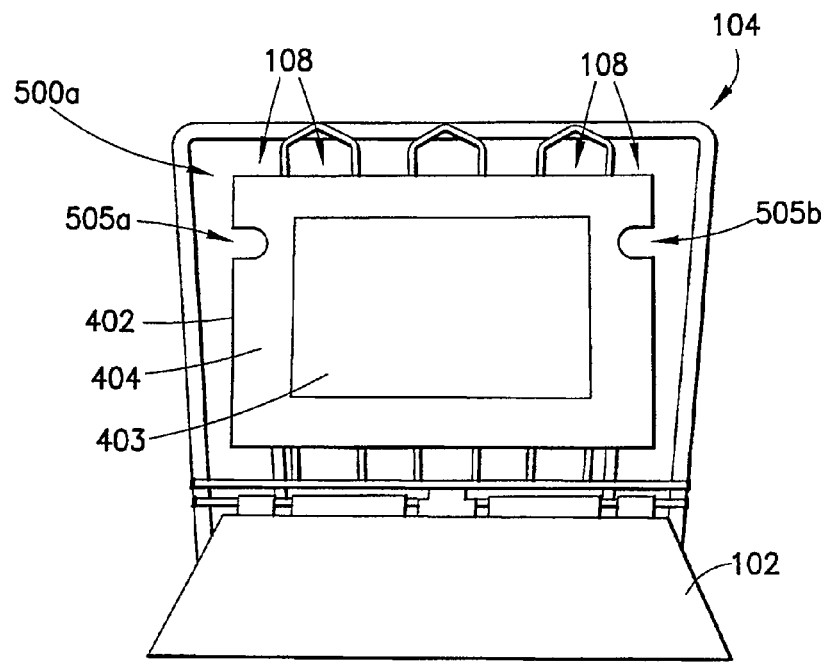

Referring now to FIG. 5B, according to another example embodiment of the invention, safety strap openings 505a and 505b may be configured and positioned along frame body 402/frame area 404 such that when frame body 402 is secured to seat back 104, the safety strap openings reside over the slots/openings 108 of seat back 104, as similarly described and shown for ad sign 400a in FIG. 4M, for example. Similar to ad sign 400a, when ad sign 500a is used in this fashion, the safety strap openings may act as positioning elements, thereby allowing the ad sign to provide secondary suitable attachment points for a safety strap. Here, fasteners 206 of safety strap 200a may be inserted through the safety strap openings and connected to bars behind the ad sign, for example. Alternatively, webbing 202 of a safety strap 200b may be inserted through the safety strap openings and extended across the back face of the seat back and/or interleaved between and/or around the bars of the seat back, for example.

According to another example embodiment of the invention, rather than inserting the safety strap through safety strap openings 505a and 505b and connecting the strap to seat back 104 as described above, the safety strap may be inserted through the safety strap openings and connected only to the ad sign or connected to both the ad sign and the seat back, as similarly described above for ad signs 400a, 400b, and 400c, for example. Here again, the ad sign may provide secondary suitable attachment points for a safety strap. For example, when using ad sign 500a with a safety strap like strap 200b, webbing 202 of the safety strap may be inserted through the safety strap openings 505a and 505b and extended between back side 402b of frame body 402 and the front face of seat back 104, thereby securing the strap only to the ad sign. Here, ad sign 500a is preferably secured to the seat back such that the sign does not easily slide along or pull free from the seat back. As similarly described above, the strap may simply extend across the back side 402b of the frame body or may be connected to/integral with the frame body. As an alternative, in addition to securing the strap to the ad sign, the strap may also be secured to the seat back, as described above.

As another example, ad sign 500a may resemble ad sign 400b of FIG. 4N, for example. Specifically, as similarly described for ad sign 400b, ad sign 500a may include one or more safety strap openings 505a and 505b and may also include one or more safety strap anchors along back side 402b of frame body 402, for example. Here, fasteners 206 of strap 200a, for example, may be inserted though openings 505a and 505b and detachably attached and/or permanently attached to the anchors such that the strap is only connected to the ad sign. Alternatively, one or both ends of the strap may be attached to both the anchors and the bars of the seat back. Again, one skilled in the art will recognize that various other combinations of securing the safety strap to the ad sign and/or seat back are possible. As another alternative, rather than using fasteners 206 and/or anchors, one or both ends of the strap may be inserted though openings 505a and 505b and detachably attached and/or permanently attached to the frame body using any mechanism known in the art, as similarly described above for ad sign 400b.

As a further example, ad sign 500a may include two frame bodies, as similarly described for ad sign 400c of FIG. 4O, for example. Here, the frame body connected to the front face of the seat back may include one or more safety strap openings 505a and 505b, for example, and the frame body connected to the back face of the seat back may include one or more safety strap anchors, for example, on the back side thereof. As described for ad sign 400c, fasteners 206 of a strap 200a, for example, may be inserted through openings 505a and 505b of the front fame body and may be detachably attached and/or permanently attached to the anchors of the rear frame body, thereby connecting the strap only to the ad sign. Alternatively, one or both fasteners 206 may be attached to respective anchors and also to bars of the seat back that may reside in close proximity to the anchors, thereby connecting the strap to both the ad sign and the seat back. Again, one skilled in the art will recognize that other variations/combinations are possible for attaching the safety strap to the ad sign and/or seat back and will also recognize that other attachment mechanisms for securing a safety to the rear frame body may be used, as similarly described for ad sign 400b.

In general, while safety strap openings 505a and 505b are illustrated in FIGS. 5A and 5B as being semi-ovals in shape, any suitable shape may be used. Similarly, while openings 505a and 505b are illustrated as being horizontally adjacent from each other and as being positioned at similar locations along opposing sides of frame area 404, this positioning is not required. Furthermore, note that ad sign 500a is not limited to two safety strap openings 505a and 505b and may include, for example, one opening or more than two openings.

Figure 6A:
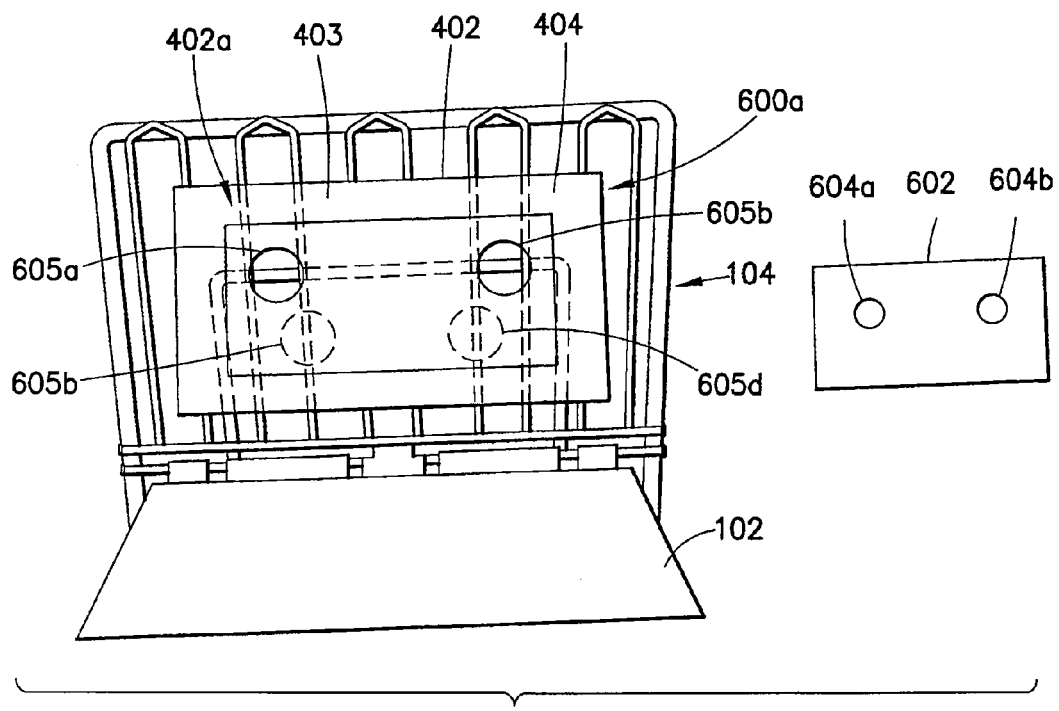
FIG. 6A shows an example ad sign with a content display area and an example display card to be retained in the content display according to the present invention, the ad sign including safety strap openings within the content display area and the display card including corresponding openings to access the safety strap openings within the content display area.

Referring now to FIG. 6A, there is illustrated example ad sign 600a according to an example embodiment of the invention. Ad sign 600a substantially resembles ad sign 400a, for example, and includes a frame body 402. On the front side 402a of frame body 402 is a content display area 403 surrounded by a frame/frame area 404, although frame/frame area 404 is not required.

According to an embodiment of the invention, content display area 403 may be a solid or substantially solid surface. The content display area may contain permanent information content that may be directly printed/formed on the content display area. Alternatively, the permanent information content may be in the form of one or more display cards permanently affixed to the content display area. As another alternative, ad sign 600a may have a form such that one or more replaceable display cards may be attached within content display area 403. In this latter case, any suitable mechanism known in the art for securing the display card(s) may be used, including those described for ad sign 400a. As further alternative, ad sign 600a may include permanent information content and also include attachment mechanisms for retaining one or more replaceable display cards within content display area 403.

Ad sign 600a also includes a frame attachment mechanism that may be any suitable mechanism known in the art, including those described above for ad sign 400a. Similarly, ad sign 600a may also include two frame bodies, as illustrated in FIG. 4J, for example.

According to this embodiment of the invention, formed within content display area 403 is one or more safety strap openings, such as safety strap openings 605a and 605b. These safety strap openings extend from the front side 402a to the back side 402b of frame body 402. According to an example embodiment of the invention, safety strap openings 605a and 605b may be configured and positioned within the content display area such that when frame body 402 is secured to seat back 104, safety strap openings 605a and 605b expose or provide access to the designated safety strap attachment points on the seat back, as illustrated in FIG. 6A, for example. The safety strap, such as strap 200a or 200b, may be attached to seat back 104 as similarly described and shown for ad sign 400a in FIG. 4K, for example. Here, safety strap openings 605a and 605b may have any suitable size and need only have sufficient size such that fasteners 206 and/or webbing 202, for example, may pass through and access seat back 104.

According to another example embodiment of the invention, safety strap openings 605a and 605b may be configured and positioned within content display area 403 such that when frame body 402 is secured to seat back 104, the openings may establish secondary suitable attachment points. For example, as similarly described and shown for ad sign 400a in FIG. 4L, safety strap openings 605a and 605b may be situated over points along vertical bars of the seat back that are normally not suitable attachment points. Again, the ad sign now allows a safety strap, such as strap 200a or 200b, to be attached to such points, as described for ad sign 400a, for example. As similarly described above, the outer perimeter edges/sides of safety strap openings 605a and 605b now act as positioning elements that prevent the fasteners 206 or webbing 202 of the safety strap, for example, from sliding along the bars. Accordingly, safety strap openings 605a and 605b preferably have a suitable size to limit the movement of the fasteners/webbing. In addition, frame body 402 preferably includes a frame attachment mechanism such that when the frame body is attached to seat back 104, the frame body will not move horizontally or vertically, for example.

According to another example embodiment of the invention, safety strap openings 605a and 605b may be positioned over slots/openings 108 of the seat back, for example, as similarly described and shown for ad sign 400a in FIG. 4M, for example. Here again, the ad sign may establish secondary suitable attachment points. Again, the safety strap 200a or 200b, for example, may be attached to the seat back as similarly described above for ad sign 400a.

According to another example embodiment of the invention, rather than inserting the safety strap through safety strap openings 605a and 605b of ad sign 600a and connecting the strap to seat back 104, the safety strap may be inserted through the safety strap openings and connected only to the ad sign or connected to both the ad sign and the seat back, as similarly described, for example, for ad signs 400a, 400b, and 400c. For example, when using ad sign 600a with a safety strap like strap 200b, webbing 202 of the safety strap may be inserted through the safety strap openings 605a and 605b and extended between back side 402b of frame body 402 and the front face of seat back 104, thereby securing the strap only to the ad sign. As similarly described above for ad sign 400a, the strap may also be connected to/integral with the frame body. As another alternative, in addition to securing the strap to the ad sign, the strap may also be secured to the seat back, as described above.

As another example, ad sign 600a may resemble ad sign 400b of FIG. 4N, for example, and include one or more safety strap openings 605a and 605b and also include one or more safety strap anchors along back side 402b of frame body 402, for example. Here, fasteners 206, for example, of a strap 200a may be inserted through openings 605a and 605b and detachably attached and/or permanently attached to the safety strap anchors such that the strap is only connected to the ad sign. Alternatively, one or both ends of the strap may be attached to both the anchors and the bars of the seat back. Again, one skilled in the art will recognize that various other combinations of securing the safety strap to the ad sign and/or seat back are also possible. As another alternative, rather than using fasteners 206 and/or safety strap anchors, one or both ends of the strap may be inserted though openings 505a and 505b and detachably attached and/or permanently attached to the frame body using any mechanism known in the art, as similarly described above for ad sign 400b.

As a further example, ad sign 600a may include two frame bodies as similarly described for ad sign 400c of FIG. 4O, for example. Here, the frame body connected to the front face of the seat back may include one or more safety strap openings 605a and 605b, for example, and the frame body connected to the back face of the seat back may include one or more safety strap anchors, for example, on the back side thereof. Here, fasteners 206 of a strap 200a, for example, may be inserted through openings 605a and 605b of the front fame body and connected to the anchors of the rear frame body, thereby connecting the strap only to the ad sign. Alternatively, one or both fasteners 206 may be attached to respective anchors and also to bars of the seat back that may reside in close proximity to the anchors, thereby connecting the strap to both the ad sign and the seat back. Again, one skilled in the art will recognize that other variations/combinations are possible for attaching the safety strap to the ad sign and/or seat back and will also recognize that other attachment mechanisms for securing a safety to the rear frame body may be used, as similarly described for ad sign 400c.

In general, while safety strap openings 605a and 605b are illustrated in FIG. 6A as being circular in shape, any suitable shape may be used. Similarly, while openings 605a and 605b are illustrated as being horizontally adjacent from each other and as being positioned at similar locations along opposing positions in content display area 403, this positioning is not required. In addition, note that ad sign 600a is not limited to two safety strap openings 605a and 605b and may include, for example, only one opening or more than two openings, as illustrated in FIG. 6A by additional openings 605c and 605d (shown in phantom lines), for example.

For each of the embodiments of ad sign 600a described above, if the ad sign is configured to have permanent information content printed/formed on content display area 403, the information content is preferably designed around safety strap openings 605a and 605b. Alternatively, if the ad sign is configured such that one or more permanent and/or replaceable display cards (such as card 602 as illustrated in FIG. 6A) are to be placed within the content display area and the display card(s) conceal safety strap openings 605a and 605b when attached to the ad sign, the display card(s) preferably also include one or more safety strap openings, such as openings 604a and 604b. Safety strap openings 604a and 604b may be positioned in the display card to coincide or partially coincide with the safety strap openings 605a and 605b formed in content display area 403. Generally, the size and shape of safety strap openings 604a and 604b do not need to coincide with the size and shape of safety strap openings 605a and 605b, for example.

Figure 6B:
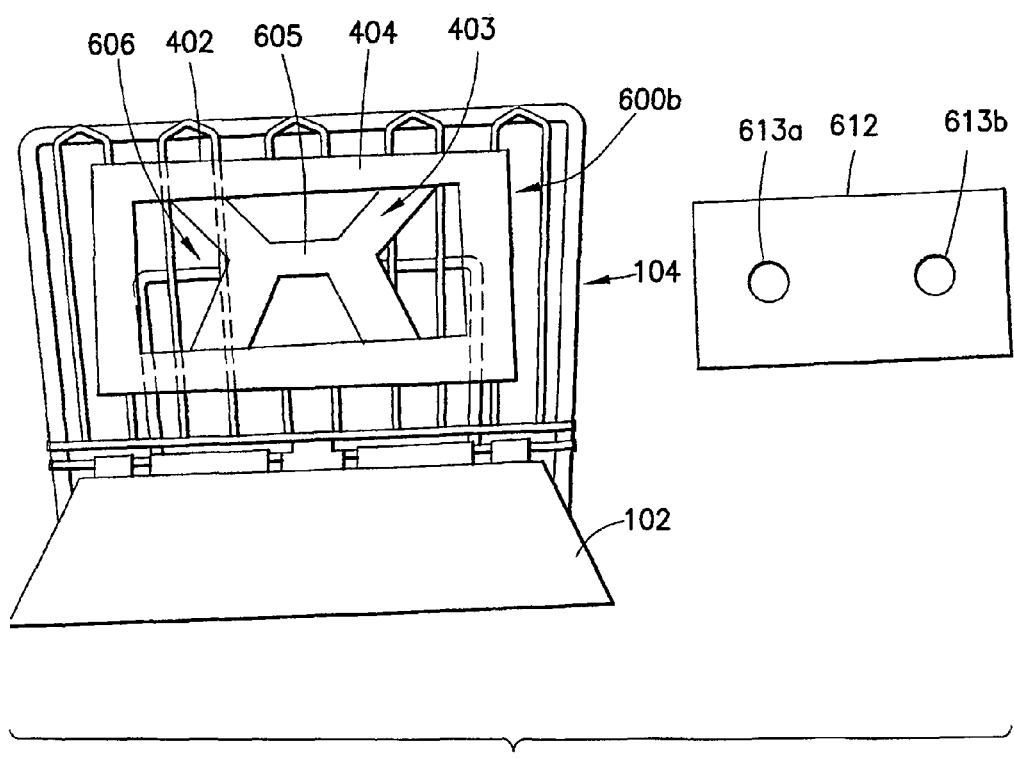
FIG. 6B shows an example ad sign according to the present invention, the ad sign to be used with a display card with openings formed therein to secure a safety strap to a shopping cart child seat.

Referring now to FIG. 6B, there is illustrated example ad sign 600b according to another example embodiment of the invention. Ad sign 600b is configured to receive, for example, one or more permanent and/or replaceable display cards 612 over content display area 403. As illustrated in FIG. 6B, the content display area of ad sign 600b may be a partial surface 605 that forms a plurality of cut-outs 606 or alternatively, the content display area may have a single cut-out thereby forming an open window, for example, such as illustrated in FIG. 4C, for example. According to this example embodiment of the invention, display card 612 may have one or more safety strap openings 613a and 613b that coincide with the cut-outs/ window 606 and that also coincide, for example, with suitable attachment points on seat back 104. In this way, a safety strap, such as strap 200a or 200b, may be inserted through safety strap openings 613a and 613b, for example, and through the cut-outs/window 606 and secured to the set back, as similarly described above.

According to another example embodiment of the invention, rather than inserting the safety strap through safety strap openings 613a and 613b of display card 612 and through cut-outs/window 606 of ad sign 600b and then connecting the strap to seat back 104 as described above, the strap may be inserted through the safety strap openings and cut-outs/window and then permanently and/or detachably connected only to ad sign 600b or to both the ad sign and the seat back, as similarly described above for ad signs 400a, 400b, and 400c. For example, a safety strap like strap 200b may be inserted through safety strap openings 613a/613b and through cut-outs/window 606 and extended between the front face of seat back 104 and the back side 402b of surface 605 (possibly connecting the strap to surface 605 as similarly described above), thereby securing the strap only to the ad sign. As another example, ad sign 600b may include one or more safety strap anchors along back side 402b of frame body 402, as similarly described above for ad sign 400b of FIG. 4N, for example. Here, fasteners 206, for example, of strap 200a may be inserted through the safety strap openings 613a/613b and through cut-outs/window 606 and detachably attached and/or permanently attached to the safety strap anchors. Again, other variations are possible, as described above. As another example, ad sign 600b may include two frame bodies with the rear side frame body including safety strap anchors, for example, as similarly described above for ad sign 400c of FIG. 4O, for example. Here, fasteners 206, for example, of strap 200a may be inserted through the safety strap openings 613a/613b and through cut-outs/windows 606 of the front frame body and detachably attached and/or permanently attached to the safety strap anchors of the rear frame body. Again, other variations are possible.

Figure 6C:
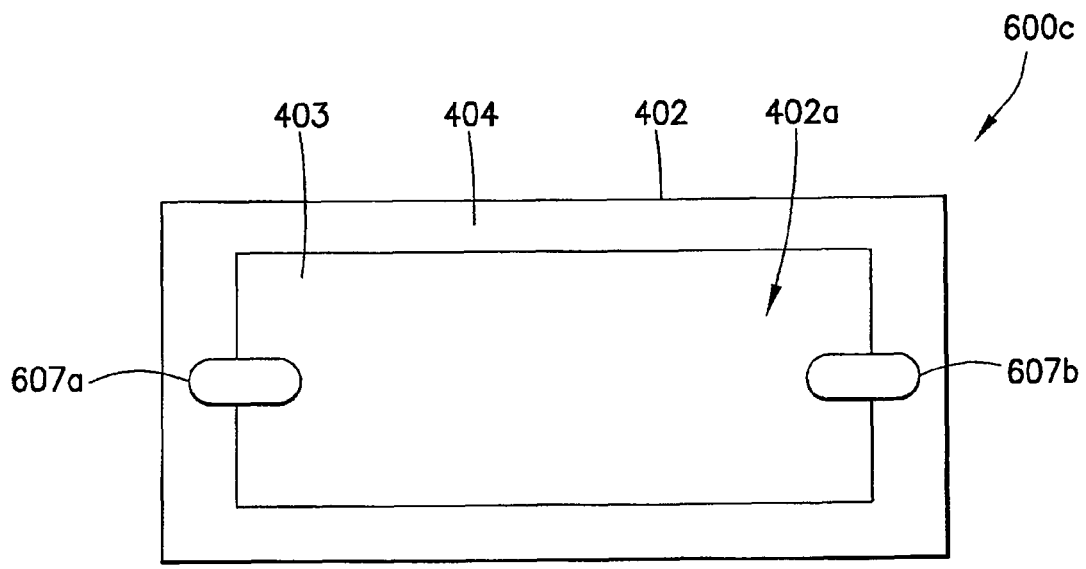
FIGS. 6C and 6D each shows an example ad sign according to the present invention, each ad sign including safety strap openings formed partially within a content display area.
Figure 6D:
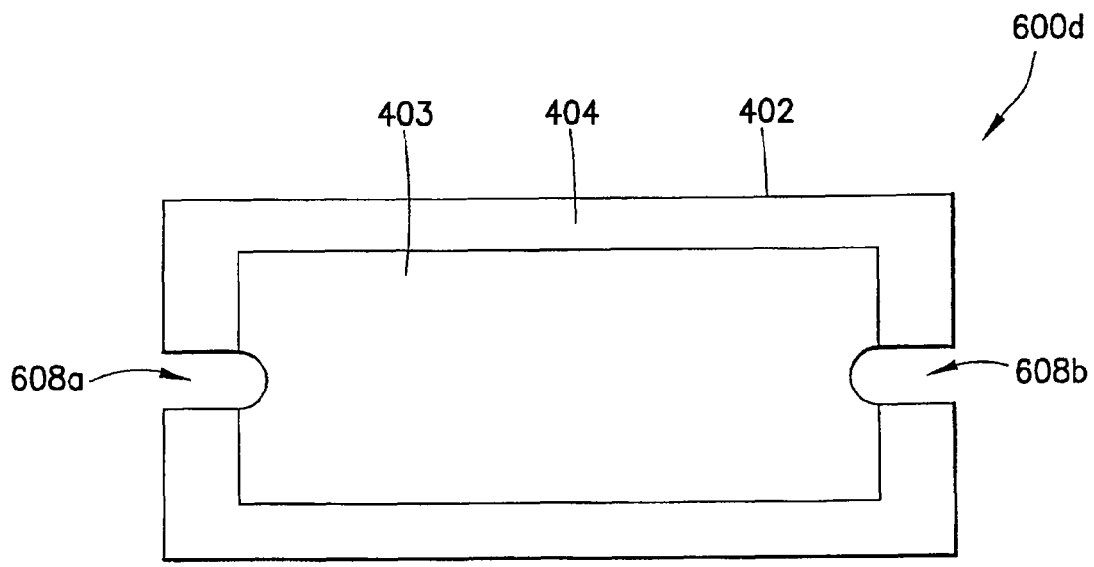

Referring now to FIG. 6C and FIG. 6D, there are illustrated example ad signs 600c and 600d according to example embodiments of the invention. Ad sign 600c is substantially similar to ad sign 400a and ad sign 600a, for example, and includes a frame body 402 with a content display area 403 surrounded by a frame/frame area 404 on front side 402a. Ad sign 600c includes one or more safety strap openings, such as openings 607a and 607b, that are formed within both frame area 404 and content display area 403 and that extend from front side 402a to back side 402b. Similarly, ad sign 600d is substantially similar to ad sign 500a, for example, and includes a frame body 402 with a content display area 403 surrounded by a frame/fame area 404 on front side 402a. Ad sign 600d includes one or more safety strap openings, such as openings 608a and 608b, formed as indents that reside in both frame area 404 and content display area 403 and that extend from front side 402a to back side 402b. Similar to ad sign 600a, for example, if ad sign 600c or ad sign 600d is configured to receive one or more permanent or replaceable display cards that conceal or partially conceal the safety strap openings 607a/b or 608a/b when the cards are attached to the ad sign, the display cards preferably also include one or more safety strap openings that coincide or partially coincide with the safety strap openings of the ad sign. Again, one skilled in the art will also recognize that ad signs 600c and 600d may resemble ad signs 400b and 400c, as described above.

Figure 7A:
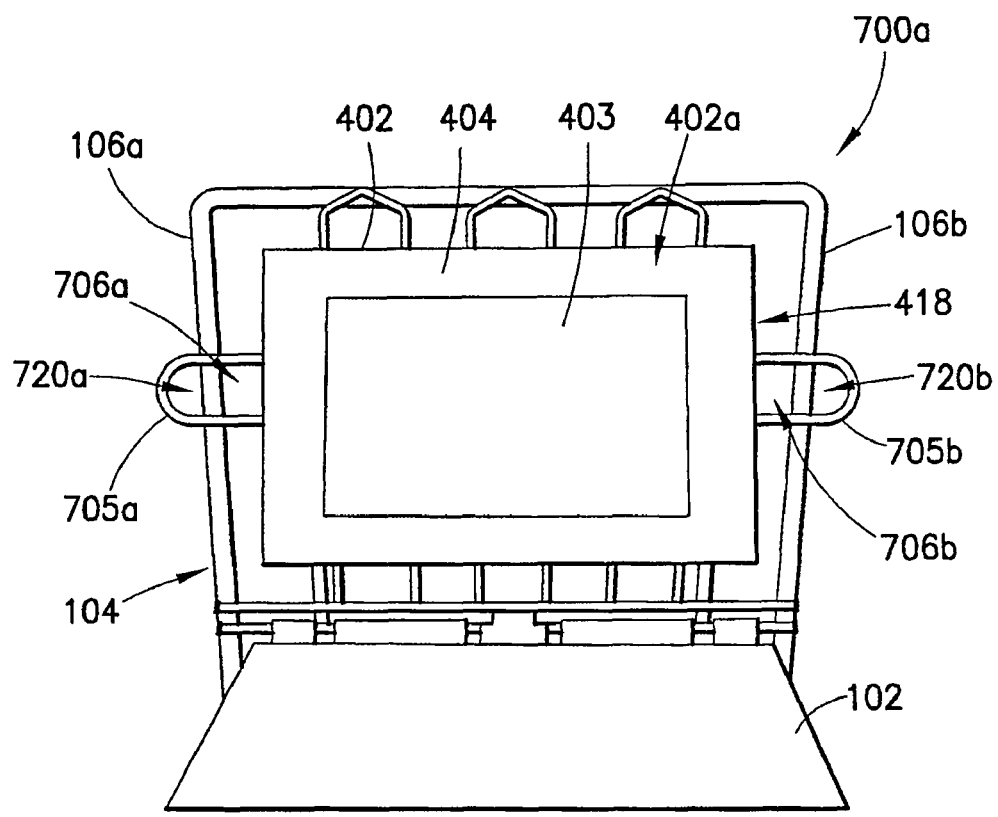
FIG. 7A shows an example ad sign according to the present invention, the ad sign including safety strap anchors for securing a safety strap to a shopping cart child seat.

Referring now to FIG. 7A, there is illustrated example ad sign 700a according to an example embodiment of the invention. Ad sign 700a includes frame body 402 with a content display area 403 on front side 402a. Frame body 402 may further include a frame or partial frame/frame area 404 that surrounds content display area 403, as illustrated in FIG. 7A, although frame/frame area 404 is not required.

Content display area 403 is as similarly described for ad sign 400a and may contain permanent information content. Alternatively and/or additionally, ad sign 700a may include attachment mechanisms for retaining one or more replaceable display cards in content display area 403. On back side 402b of frame body 402 is any suitable frame attachment mechanism known in the art, such as those described above for ad sign 400a, including two frame bodies.

According to an example embodiment of the invention, ad sign 700a further includes one or more safety strap anchors, such as anchors 705a and 705b for example, shaped to form openings 706a and 706b, for example. Safety strap anchors 705a and 705b may be attached at any suitable points on frame body 402, such as along the perimeter 418 of the frame body, on the front side 402a or back side 402b of the frame body, or some combination thereof. Safety strap anchors 705a and 705b may extend outward from frame body 402 such that the anchors lie in the same plane as or parallel to the frame body. Nonetheless, the safety strap anchors are not required to extend in this fashion and may extend at an angle from the frame body, for example.

According to an example embodiment of the invention, safety strap anchors 705a and 705b may be configured and positioned such that when frame body 402 is secured to seat back 104, safety strap anchors 705a and 705b and the corresponding openings 706a and 706b overlap the designated safety strap attachment points on the seat back, as similarly described and shown for ad sign 400a in FIG. 4K, for example. Accordingly, when using a safety strap like strap 200a, for example, each fastener 206 of the safety strap may be inserted through one of openings 706a and 706b formed by safety strap anchors 705a and 705b and detachably attached and/or permanently attached to the bars of the seat back at the designated attachment points. Similarly, when using a safety strap like strap 200b, for example, webbing 202 may be inserted through openings 706a and 706b and interleaved, for example, through one or more slots/openings and/or around one or more bars of the seat back at the designated attachment points such that webbing 202 extends across seat back 104. Alternatively, strap 200b may be reversed, as similarly described above. Nonetheless, according to an example embodiment of the invention, the safety straps 200a or 200b, for example, do not need to be connected in the above fashions and may be connected only to the ad sign/safety strap anchors 705a/705b, to both the ad sign/safety strap anchors and seat back 104, or to some combination thereof as further described below and as shown in FIGS. 7D-7H, for example.

Figure 7B:
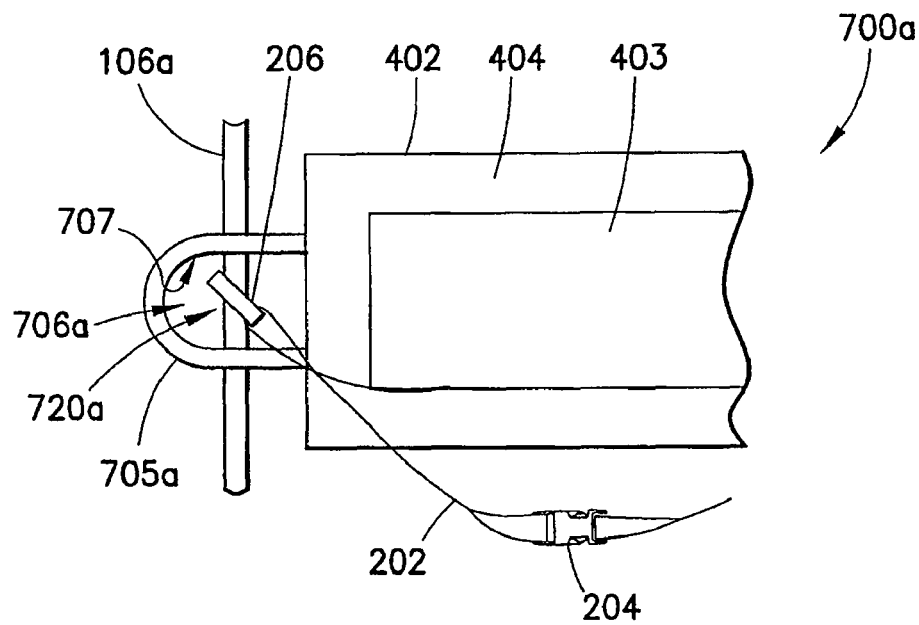
FIGS. 7B, 7C, 7D, 7E, 7F, 7G, and 7H each shows an example arrangement according to the present invention for securing a safety strap and the ad sign illustrated by FIG. 7A to a shopping cart child seat.
Figure 7C:
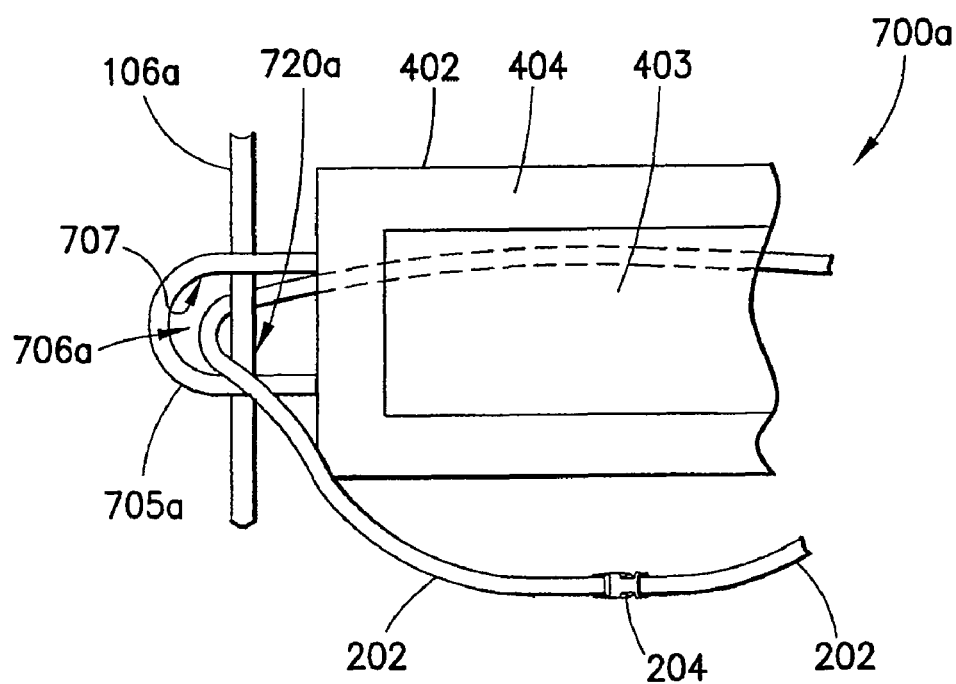

According to another example embodiment of the invention, safety strap anchors 705a and 705b may be configured and positioned such that when frame body 402 is secured to seat back 104, the anchors act as positioning elements and thereby establish secondary suitable attachment points for the safety strap. For example, referring to FIG. 7A, safety strap anchors 705a and 705b may be positioned over points 720a and 720b along vertical bars 106a, for example, which points are not designated/approved safety strap attachment points for the child seat. In one example use of ad sign 700a according to an example embodiment of the invention, a safety strap may be inserted through openings 706a and 706b and connected to seat back 104 at points 720a and 702b. For example, when using a safety strap like strap 200a, each fastener 206 may be inserted through one of the openings 706a or 706b and connected to vertical bars 106a at points 720a and 702b, for example, as partially illustrated in FIG. 7B. Alternatively, when using a safety strap like strap 200b, webbing 202 may be inserted through openings 706a and 706b and interleaved, for example, through one or more slots/openings and/or around one or more bars of the seat back such that webbing 202 extends across the seat back, for example, as partially illustrated in FIG. 7C. As illustrated in FIGS. 7B and 7C, the inner perimeter edges/sides 707 of safety strap anchors 705a and 705b act as positioning elements for the safety strap and prevent the fasteners 206 or webbing 202, for example, from sliding along vertical bars 106a, for example, thereby establishing the secondary suitable attachment points. Accordingly, safety strap anchors 705a and 705b (i.e., the size of openings 706a and 706b) preferably have a suitable size to limit the movement of the fasteners/webbing.

Figure 7D:
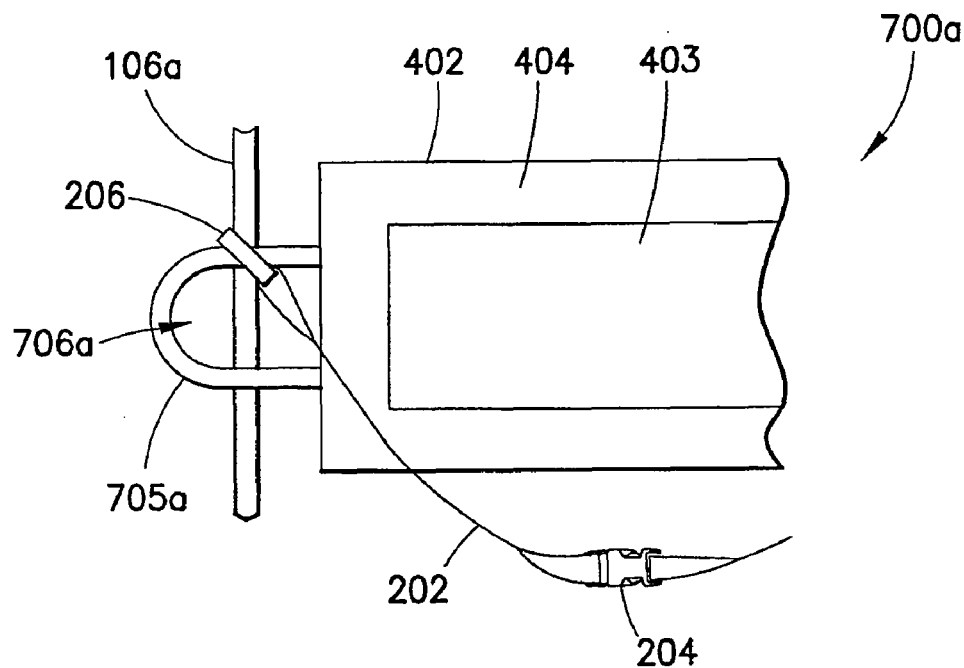
Figure 7E:
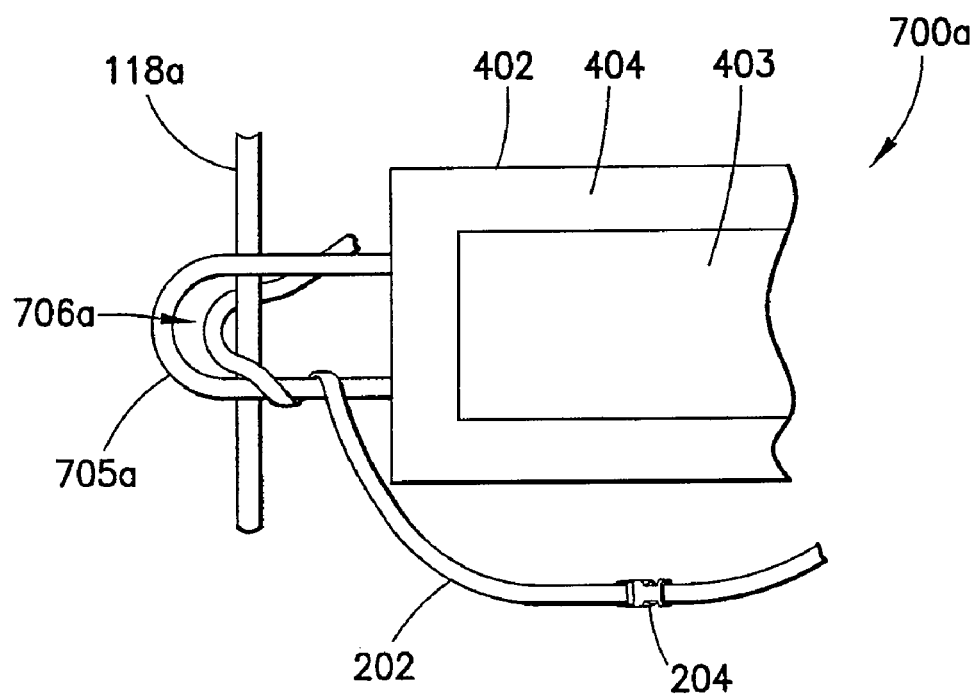
Figure 7F:
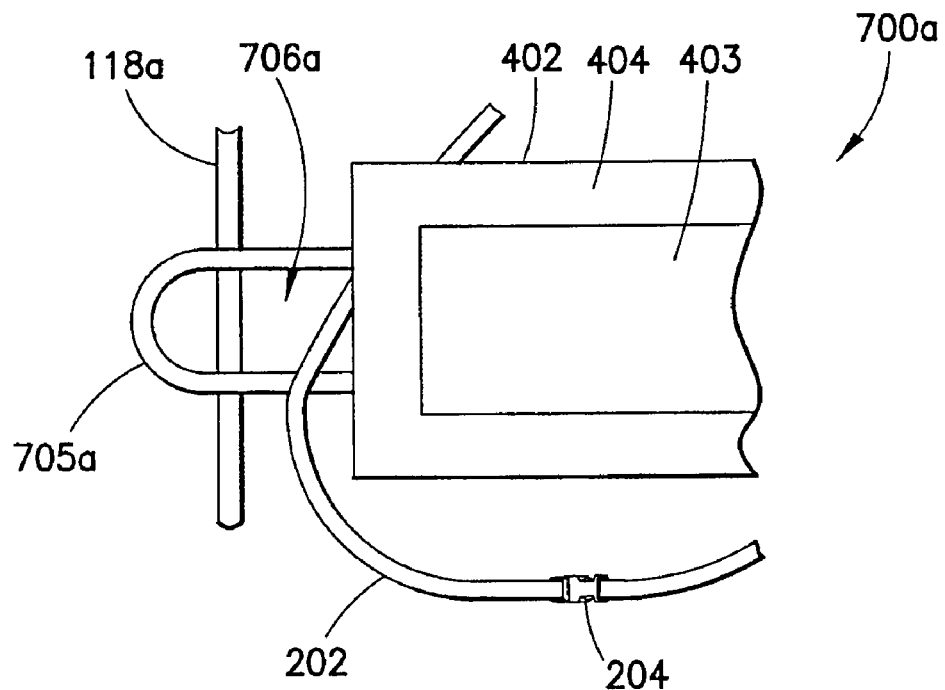
Figure 7G:
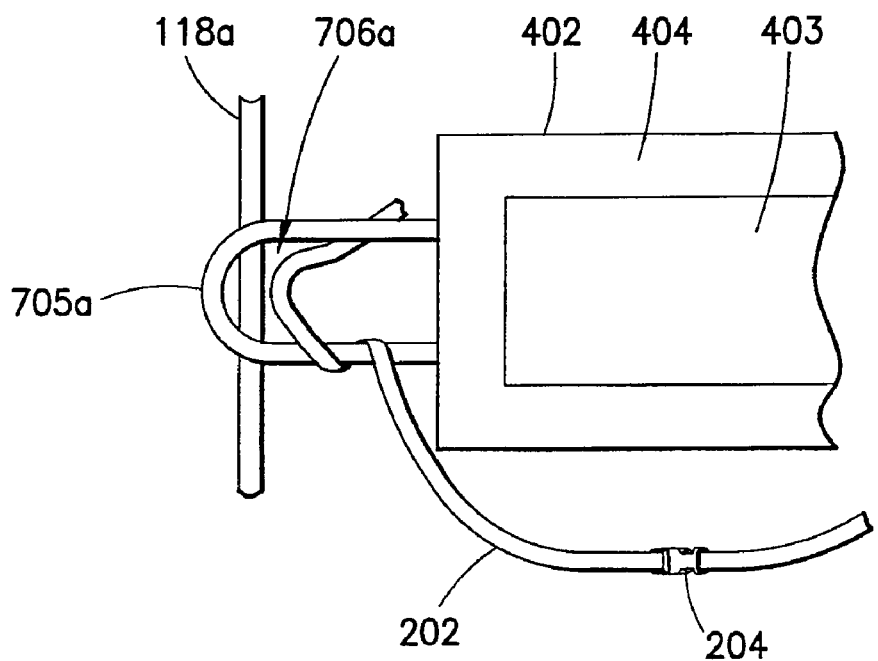

According to another example use of ad sign 700a according to an example embodiment of the invention, rather than inserting the safety strap through openings 706a and 706b as shown in FIGS. 7B and 7C, the safety strap may be connected to both seat back 104 and to safety strap anchors 705a and/or 705b. For example, when using a strap like strap 200a, either one or both fasteners 206 may be detachably attached and/or permanently attached to a respective one of the safety strap anchors 705a and 705b and to a vertical bar 106a, for example, as partially illustrated in FIG. 7D. Alternatively, when using a safety strap like strap 200b, either one or both ends of webbing 202 may be looped around a respective one of the safety strap anchors 705a and 705b, for example, and then interleaved, for example, through one or more slots/openings and/or around one or more bars of the seat back, as partially illustrated in FIG. 7E, for example. Again, as illustrated in FIGS. 7D and 7E, safety strap anchors 705a and 705b act as positioning elements to prevent the fasteners 206 or webbing 202 from sliding along vertical bars 106a, for example.

According to a further example use of ad sign 700a according to an example embodiment of the invention, rather than connecting the strap to the seat back as shown in FIGS. 7B-7E, the safety strap may be connected only to ad sign 700a, bypassing the seat back. Here again, the safety strap anchors may act as positioning elements, thereby establishing secondary suitable attachment points. For example, when using a safety strap like strap 200b, webbing 202 may be passed through openings 706a and 706b and between the front face of the seat back and the back side 402b of frame body 402, bypassing the bars of the seat back, as partially illustrated in FIG. 7F, for example. As another alternative, webbing 202 may be looped around either one or both safety strap anchors 705a and 705b and between the front face of the seat back and back side 402b of frame body 402, as partially illustrated in FIG. 7G for example. In either case, the strap may also pass through one or more fixed loops along the back side of the frame body (similar to a belt through belt loops) or may also be secured to the frame body using any suitable mechanism known in the art such as Velcro, screws, nuts and bolts, grommets, rivets, or a co-molding or clamping process.

Figure 7H:
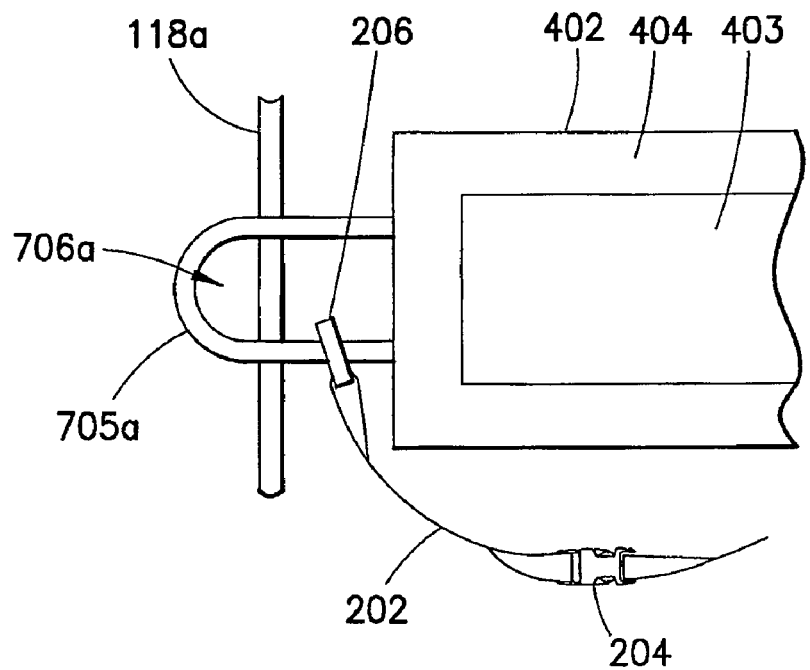

As another example of connecting the safety strap only to ad sign 700a, when using a safety strap like strap 200a, for example, either one or both fasteners 206 of the safety strap may be detachably attached and/or permanently attached to a respective safety strap anchor 705a/705b, as partially illustrated in FIG. 7H, for example. Again, one skilled in the art will recognize that the present invention is not limited to strap 200a. For example, rather than having fasteners 206, each end of the strap (i.e., webbing 202) may be inserted through a respective opening 706a/706b and around a respective anchor 705a/705b and then detachably attached and/or permanently attached back upon itself using, for example, Velcro, grommets, rivets, stitching, etc. As another example, one end of the strap may be permanently connected to one anchor while the other end of the strap has a fastener, like fastener 206. Here, rather than using a buckle 204 to secure and remove a child from the strap/child seat, the fastener may be detached from and connected to the second anchor, for example, to secure and remove a child.

Notably, ad sign 700a is not limited to the above described example uses and one skilled in the art will recognize that other uses are possible, including combinations of the above uses. For example, when using a safety strap like strap 200a, one fastener may be connected to a safety strap anchor (permanently or detachably) while the other fastener is attached to a rod of the seat back or to both an anchor and to a rod of the seat back.

Preferably, when a safety strap is connected to ad sign 700a as illustrated in FIGS. 7B-7H, for example, safety strap anchors 705a and 705b have suitable strength to resist breaking/bending when a strap is pulled away from or against the anchors. In addition, frame body 402 preferably includes a frame attachment mechanism such that when the frame body is attached to seat back 104, the frame body will not move horizontally or vertically, for example, or easily pull off the seat-back.

Note that while the safety strap anchors 705a and 705b are illustrated in FIGS. 7A-7H as extending over the front face of seat back 104, the anchors may also be configured to extend towards and over the rear face of the seat back. Here, the safety strap connections can be made as similarly described above.

Figure 7I:
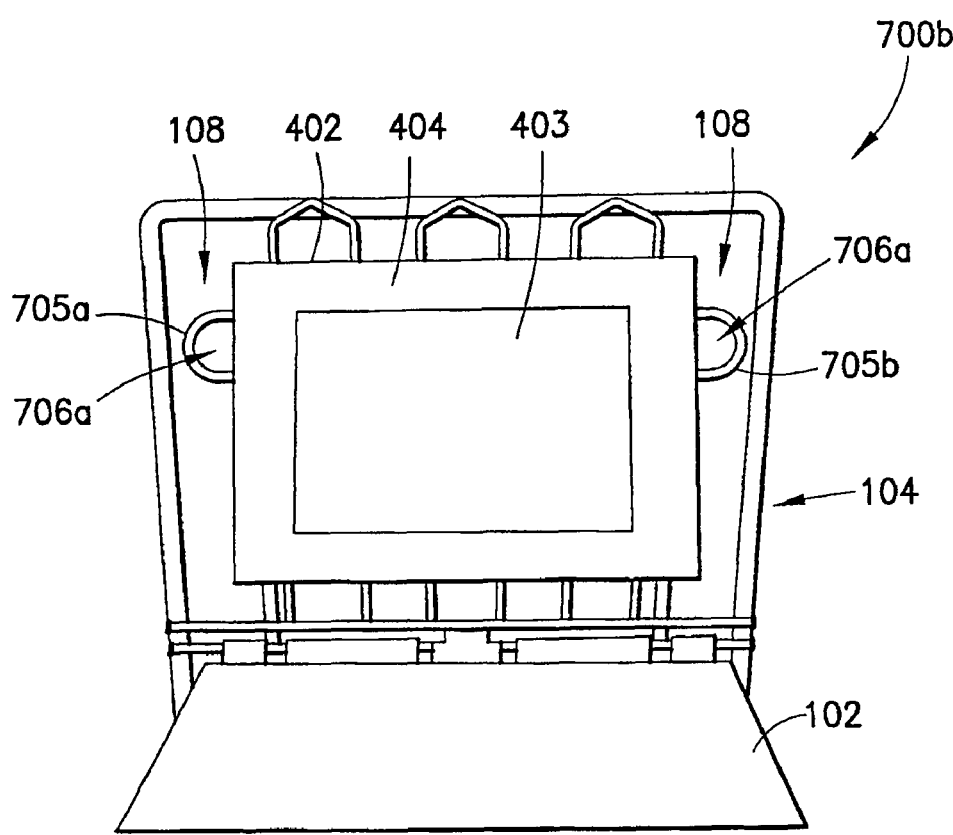
FIGS. 7I and 7J each shows an example ad sign according to the present invention, each ad sign including safety strap anchors for securing a safety strap to a shopping cart child seat.

Referring now to FIG. 7I, there is illustrated example ad sign 700b according to another example embodiment of the invention. Ad sign 700b is substantially similar to ad sign 700a, however here, safety strap anchors 705a and 705b are positioned on frame body 402 such that when the frame body is secured to seat back 104, safety strap anchors 705a and 705b reside over the slots/openings 108 of seat back 104. When ad sign 700b is configured in this fashion, the anchors may act as positioning elements and thereby establish secondary suitable attachment points for the safety strap.

Safety strap anchors 705a and 705b may be attached at any suitable points on frame body 402, such as along the perimeter 418 of the frame body or on the front side 402a or the back side 402b of the frame body, or some combination thereof. Here, safety strap anchors 705a and 705b may extend outward from frame body 402 such that the anchors lie in the same plane as or parallel to the frame body. Alternatively, safety strap anchors 705a and 705b may lie at angle to the frame body.

Similar to ad sign 700a, in example uses of ad sign 700b according to example embodiments of the invention, a safety strap may be connected to seat back 104, may be connected to both seat back 104 and to ad sign 700b, or may be connected only to ad sign 700b. For example, when using a safety strap like strap 200a, fasteners 206 may be inserted through openings 706a of safety strap anchors 705a and 705b and connected to bars behind the ad sign, for example, thereby connecting the strap to the seat back. Alternatively, webbing 202 of strap 200a may be looped, for example, around one or both safety strap anchors 705a and 705b (as similarly illustrated in FIG. 7G) prior to connecting fasteners 206 to the bars of the seat back, thereby connecting the safety strap to both the seat back and the ad sign. As another alternative, safety strap 200a may be connected only to safety strap anchors 705a and 705b (as similarly illustrated in FIG. 7H). Here, the strap may be permanently and/or detachably connected to the safety strap anchors using, for example, fasteners 206 or any other suitable mechanism known in the art as similarly described above. Again, combinations of these example uses and configurations are also possible, as similarly described above.

Similarly, when using a safety strap like strap 200b, webbing 202 may be inserted through openings 706a and 706b and extended across the back face of the seat back and/or interleaved between and/or around the bars of the seat back, for example, thereby connecting the strap to the seat back. Alternatively, webbing 202 may be looped around one or both safety strap anchors 705a and 705b, as similarly illustrated in FIG. 7G, and then extended around the seat back, for example, thereby connecting the strap to both the seat back and the ad sign. As another alternative, webbing 202 may be inserted through openings 706a and 706b and extended across back side 402b of frame body 402 and across the front face of seat back 104, thereby connecting the safety strap only to ad sign 700b. Alternatively, webbing 202 may first be looped around one or both safety strap anchors 705a and 705b, as similarly illustrated in FIG. 7G, and then extended across the back side of the frame body and across the front face of the seat back. In these latter two cases, the strap may also be connected to/integral with the frame body, as similarly described above.

Again, safety strap anchors 705a and 705b of ad sign 700b preferably have suitable strength to resist breaking/bending when a strap is pulled against or away from the anchors. In addition, frame body 402 preferably includes a frame attachment mechanism such that when the frame body is attached to seat back 104, the frame body does not move horizontally or vertically, for example, and is not easily pulled free of the seat back.

According to another example use of ad sign 700a or 700b according to an example embodiment of the invention, the ad sign includes a single frame body and is attached to the rear face of seat back 104 such that information content in content display area 403 is viewable from the rear of the shopping cart. As is readily understood by one skilled in the art, when the ad sign is used in this manner, safety strap anchors 705a and 705b may be used as similarly described above to provide a safety strap within the child seat area.

Figure 7J:
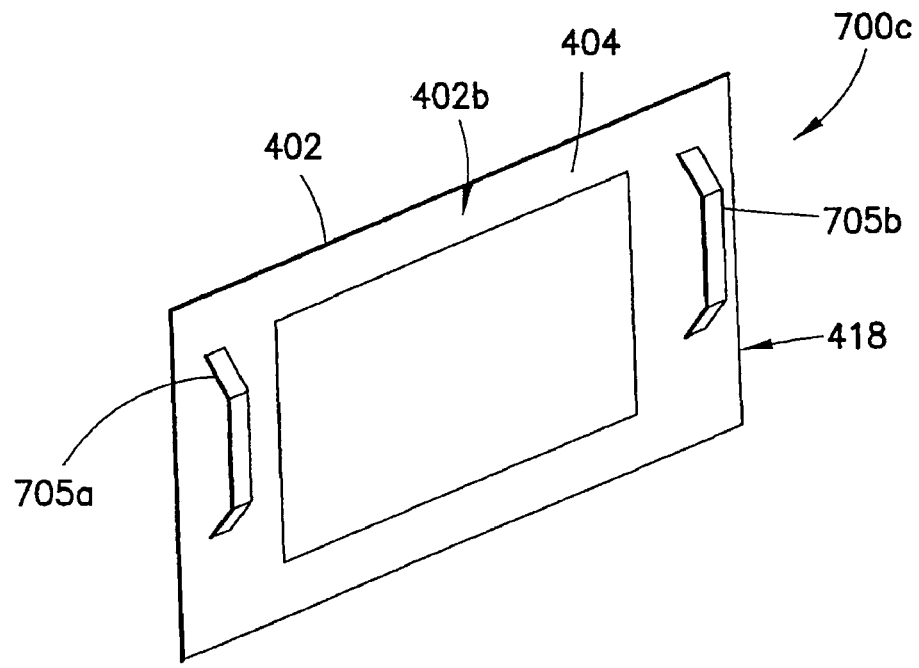

Referring now to FIG. 7J, there is illustrated example ad sign 700c according to another example embodiment of the invention. Ad sign 700c is substantially similar to ad sign 700b, for example. Here, however, the one or more safety strap anchors 705a and 705b are positioned on the perimeter 418 or back side 402b, for example, of frame body 402 and extend outward such as at a 90° angle from the back side of the frame body. Here, when the frame body is secured to seat back 104, safety strap anchors 705a and 705b may reside between the slots/openings 108 of seat back 104, possibly adjacent to bars of the seat back. Again, safety strap anchors 705a and 705b of ad sign 700c may act as positioning elements and thereby establish secondary suitable attachment points for the safety strap. As similarly described for ad signs 700a and 700b, in example uses of ad sign 700c according to example embodiments of the invention, a safety strap may be connected to seat back 104, may be connected to both seat back 104 and to ad sign 700c, or may be connected only to ad sign 700c.

Figure 7K:
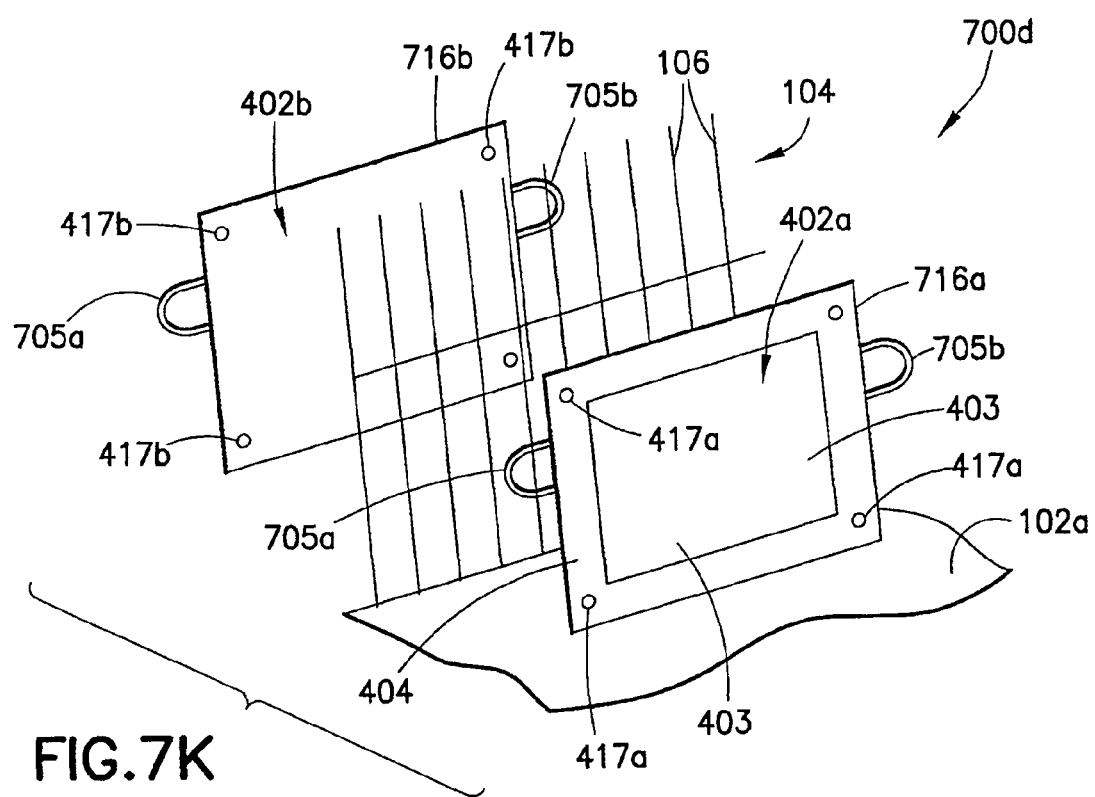
FIG. 7K shows an example ad sign according to the present invention, the ad sign including two frame bodies with safety strap anchors, each frame body to be attached to opposing sides of a seat back of a shopping cart child seat.

Referring to FIG. 7K, there is illustrated example ad sign 700d according to an example embodiment of the invention. Ad sign 700d is substantially similar to ad sign 700a or 700b, for example (and may also resemble ad sign 700c), but includes two frame bodies 716a and 716b such that one frame body attaches to the front face of seat back 104 and the other frame body attaches to the back face of the seat back. As illustrated in FIG. 7K, both frame bodies may include safety strap anchors 705a and 705b. The safety strap anchors of each frame body may or may not coincide and may or may not be similarly angled/positioned. Alternatively, either only the front frame body or the rear frame body may include safety strap anchors 705a and 705b. Note that according to this embodiment of the invention, frame body 716b may or may not include a content display area on the front side thereof for displaying information content.

In general, ad sign 700d may be used as similarly described above with respect to ad signs 700a and 700b, for example. In particular, when both frame bodies include safety strap anchors, the safety strap may be connected (detachably or permanently) within the child seat area using the safety strap anchors of either frame body 716a, frame body 716b, or both frame bodies. Similarly, when only frame body includes safety strap anchors, the safety strap may be connected within the child seat area using those anchors.

In general, while safety strap anchors 705a and 705b of ad signs 700a, 700b, 700c, and 700d are illustrated as being semi-circles or semi-ovals in shape, any suitable shape may be used. Similarly, while safety strap anchors 705a and 705b are illustrated as being horizontally adjacent from each other and as being positioned at similar locations along opposing sides of frame body 402, this positioning is not required. Furthermore, while anchors 705a and 705b are illustrated as being situated along the vertical sides of the frame body, the anchors may also be positioned along the top or bottom horizontal sides of the frame body, for example.

Figure 7L:
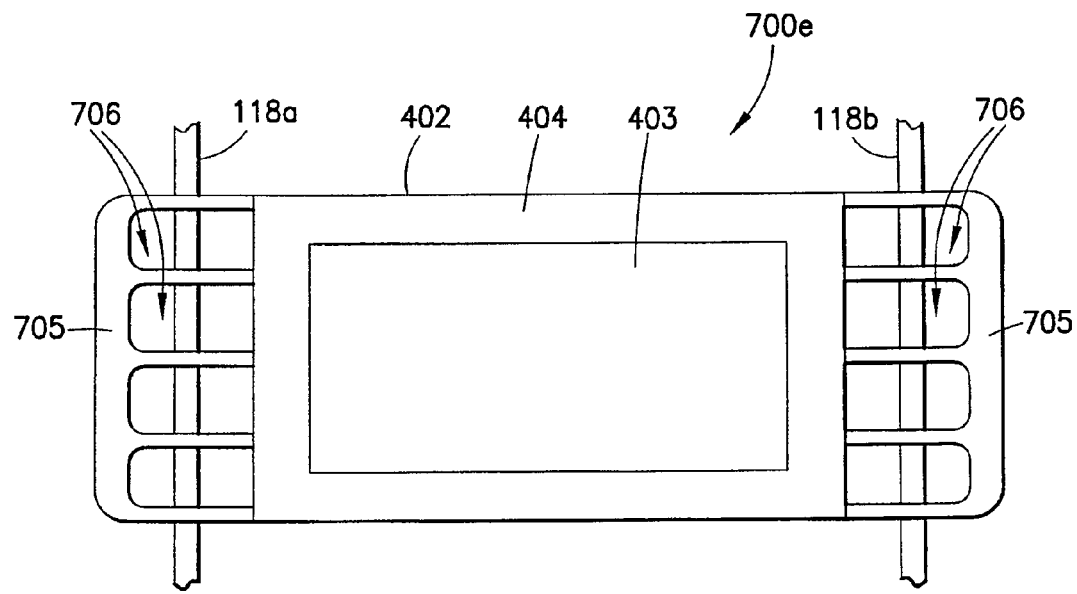
FIGS. 7L and 7M each shows an example ad sign according to the present invention, each ad sign including a plurality of safety strap anchors.
Figure 7M:
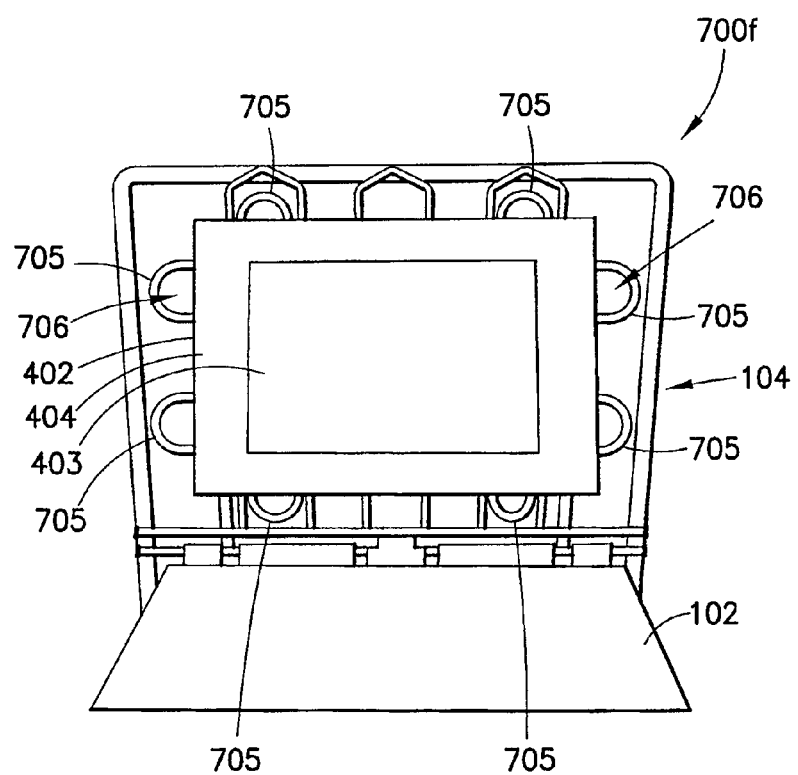

Furthermore, ad signs 700a, 700b, 700c, and 700d are not limited to two safety strap anchors 705a and 705b and may include, for example, one anchor or more than two anchors, as illustrated by ad signs 700e and 700f in FIGS. 7L and FIG. 7M, for example.

Figure 8A:
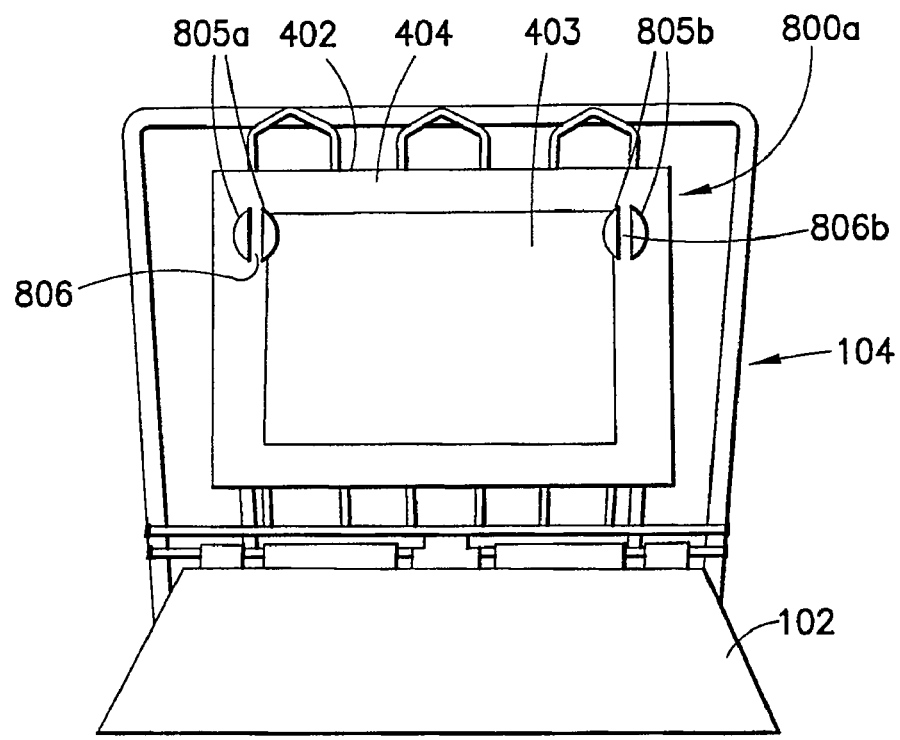
FIG. 8A shows an example ad sign according to the present invention, the ad sign including safety strap anchors formed within the body of the ad sign, the anchors allowing a safety strap to be secured to a shopping cart child seat.

Referring now to FIG. 8A, there is illustrated example ad sign 800a according to an example embodiment of the invention. Ad sign 800a includes a frame body 402 with a content display area 403 on front side 402a. Frame body 402 may further include a frame or partial frame/frame area 404 that surrounds content display area 403, as illustrated in FIG. 8A, although a frame/frame area is not required. Ad sign 800a may include permanent information content in content display area 403 and/or may include attachment mechanisms on frame body 402 that allow one or more replaceable display cards to be attached to content display area 403. On back side 402b of frame body 402 is any suitable frame attachment mechanism known in the art, such as those described above for ad sign 400a, including two frame bodies.

Formed within frame body 402 are one or more safety strap anchors, such as anchors 806a and 806b, for example. Anchors 806a and 806b may be formed, for example, by creating one or more openings, such as openings 805a and 805b, within the frame body. Here, safety strap anchors 806a and 806b may be molded into and thereby integral with frame body 402. Nonetheless, one skilled in the art will recognize that any mechanism known in the art for forming the anchors may be used. For example, one or more indentations may be formed in the frame body and anchors 806a and 806 formed across the indentations.

Safety strap anchor 806a or 806b may reside in the plane of frame body 402 or may extend outward or inward, for example, from the plane of the frame body. Openings 805a/805b and anchors 806a/806b may be situated within frame/frame area 404, within content display area 403, or within a combination of both areas, as illustrated in FIG. 8A, for example. If frame body 402 of ad sign 800a is extended to include tabs 413a and 413b as an attachment mechanism, as illustrated in FIG. 4H for example, openings 805a/805b and anchors 806a/806b may reside within frame area 404, may reside within both frame area 404 and tabs 413a and 413b, or may totally reside within tabs 413a and 413b, for example.

Similar to ad sign 600a, for example, if ad sign 800a is configured to receive one or more permanent or replaceable display cards that conceal or partially conceal openings 805a/805b and/or safety strap anchors 806a/806b when the cards are attached to the ad sign, the display cards preferably also include one or more openings that coincide or partially coincide with the openings/anchors.

Assuming safety strap anchors 806a/806b are formed by openings 805a/805b (as compared to indentations), according to an example embodiment of the invention, the openings and safety strap anchors may be configured and positioned such that when frame body 402 is secured to seat back 104, the openings provide access to the designated safety strap attachment points on the seat back. According to another example embodiment of the invention, openings 805a/805b and safety strap anchors 806a/806b may be configured and positioned such that when frame body 402 is secured to seat back 104, the openings/anchors act as positioning elements/guides and establish secondary suitable attachment points. Here, openings 805a/805b and anchors 806a/806b may be positioned over slots/openings 108 of seat back 104. Alternatively, the openings and anchors may be positioned at points over the bars of the seat back that are not suitable attachment points.

Figure 8B:
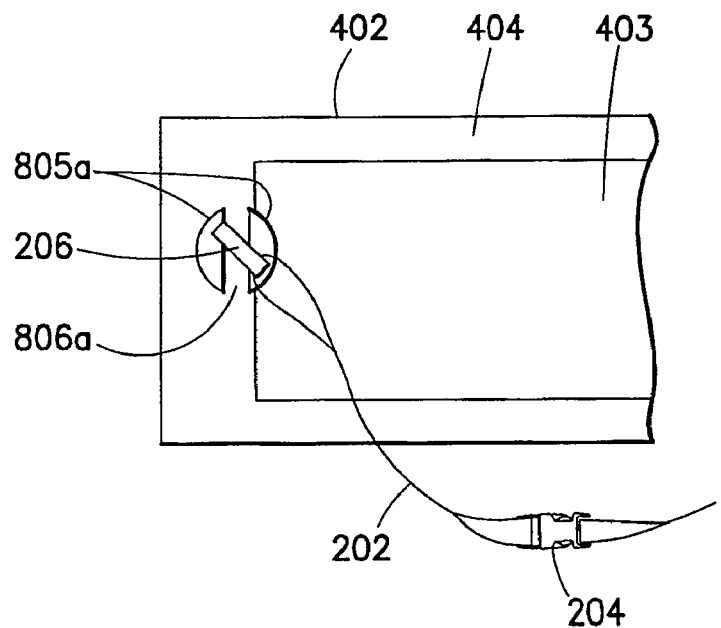
FIG. 8B shows an example arrangement according to the present invention for securing a safety strap and the ad sign illustrated by FIG. 8A to a shopping cart child seat.

One skilled in the art will recognize that safety strap anchors 806a/806b and openings 805a/805b are similar to safety strap anchors 705a/705b and openings 706a/706b of ad signs 700a and 700b, for example. As such, according to example uses of ad sign 800a according to example embodiments of the invention, a strap may connected to seat back 104, to both seat back 104 and ad sign 800a, to only to ad sign 800a, or some combination thereof as similarly described above for ad signs 700a and 700b, for example. As one example, when using a safety strap such as strap 200a, for example, either one or both fasteners 206 of the safety strap may be detachably attached and/or permanently attached to a respective safety strap anchor 805a/805b, as partially illustrated in FIG. 8B, for example. Preferably, when a safety strap is connected to safety strap anchors 805a and 805b, the anchors have suitable strength to resist breaking/bending when a strap is pulled away from the anchors.

As illustrated in FIG. 8A, for example, ad sign 800a may include a single frame body 402 and be attached to the front face of seat back 104. According to another example use of ad sign 800a according to an example embodiment of the invention, the ad sign may include a single frame body that is attached to the rear face of seat back 104 such that information content in content display area 403 is viewable from the rear of the shopping cart. As is readily understood by one skilled in the art, when the ad sign is used in this manner, openings 805a and 805b and anchors 806a and 806b may be used to provide a safety strap within the child seat area.

According to another example embodiment of the invention, ad sign 800a is similar to ad sign 700d of FIG. 7K and includes two frame bodies such that one frame body attaches to the front face of seat back 104 and the other frame body attaches to the back face of the seat back. Either both frame bodies may include openings 805a and 805b and safety strap anchors 806a and 806b, or only the front frame body or the rear frame body may include the openings and anchors.

Figure 8C:
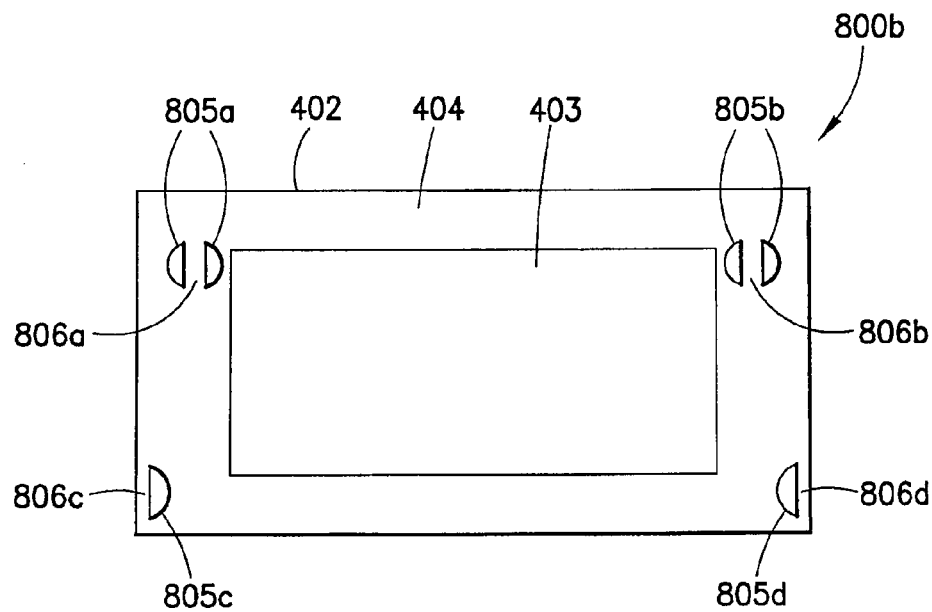
FIGS. 8C shows an example ad sign according to the present invention, the ad sign including a plurality of safety strap anchors.

In general, while openings 805a and 805b are illustrated as being semi-circles, any suitable shape that allows for the formation of anchors 806a and 806b may be used. Similarly, while openings 805/805b and anchors 806a/806b are illustrated as being horizontally adjacent from each other and as being positioned at similar locations along opposing sides of frame body 402, this positioning is not required. Furthermore, while openings 805a/805b and anchors 806a/806b are illustrated as being situated along the sides of the frame body, the openings/anchors may be positioned along the top or bottom sides of the frame body, for example. Furthermore, ad sign 800a is not limited to two openings/anchors and may include, for example, one anchor or more than two anchors, as illustrated, for example, by openings 805a-d and anchors 806a-d of ad sign 800b in FIG. 8C.

Figure 9A:
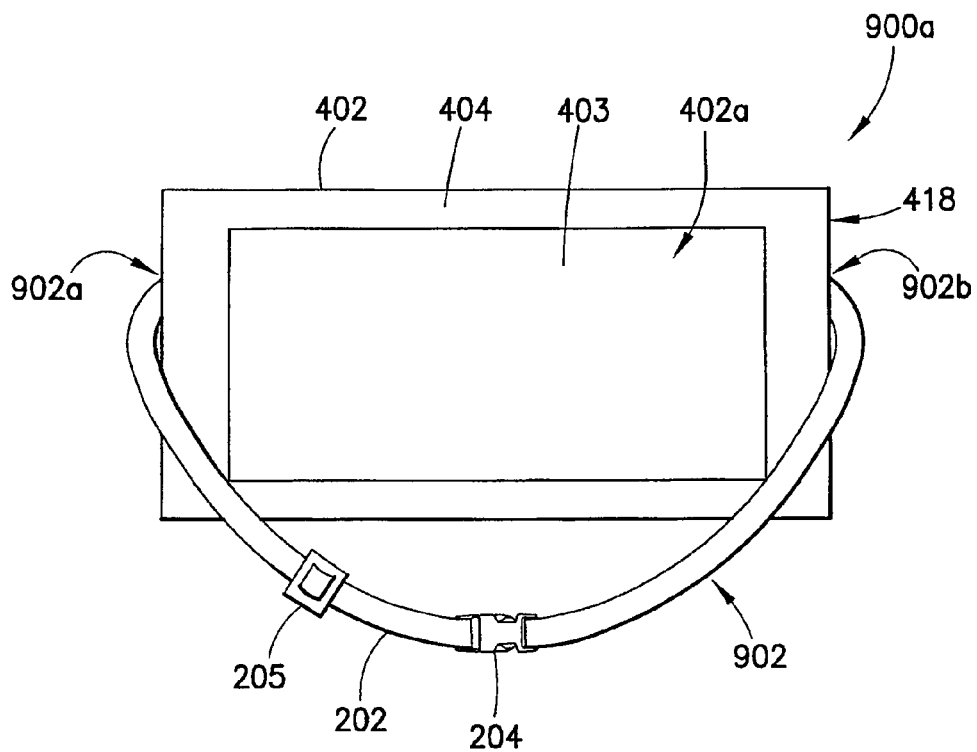
FIGS. 9A and 9B each shows an example ad sign according to the present invention, each ad sign including a safety strap attached to the ad sign.

Referring now to FIG. 9A, there is illustrated an example ad sign 900a according to an example embodiment of the invention. Ad sign 900a includes a frame body 402 with a content display area 403 on front side 402a. Frame body 402 may further include a frame or partial frame/frame area 404 that surrounds content display area 403, although a frame/frame area is not required. Ad sign 900a may include permanent information content in content display area 403 and/or may include attachment mechanisms on frame body 402 that allow one or more replaceable display cards to be attached to content display area 403. Ad sign 900a may include one frame body or two frame bodies, for example, one for each side of seat back 104 (note that the rear frame body may or may not include a content display area). Preferably, the ad sign includes any suitable frame attachment mechanism that prevents the frame body from easily pulling away from and/or sliding along seat back 104 once the frame body is attached to the seat back.

According to an example embodiment of the invention, ad sign 900a includes a safety strap 902 that preferably includes a buckle 204 and adjuster 205, although the buckle and/or adjuster are not required. Here, each end 902a and 902b of the safety strap is permanently and/or detachably secured to the frame body. In general, any suitable mechanism known in the art for securing the ends of safety strap 902 to the ad sign may be used including, for example, Velcro, screws, nuts and bolts, grommets, rivets, a co-molding process, a clamping process, or some combination thereof. Ends 902a and 902b of the strap may be connected at any suitable location on frame body 402 including, for example, the back side of the frame body, the front side 402a of the frame body, along the perimeter 418 of the frame body, or some combination thereof. If ad sign 900a includes two frame bodies, for example, either one or both ends of the strap may be connected to the front frame body, the rear frame body, or some combination thereof.

Notably, if ad sign 900a includes one frame body, the frame body may be configured to be attached to the front face or the rear face of seat back 104 and provide safety strap 902 within the child seat area.

Figure 9B:
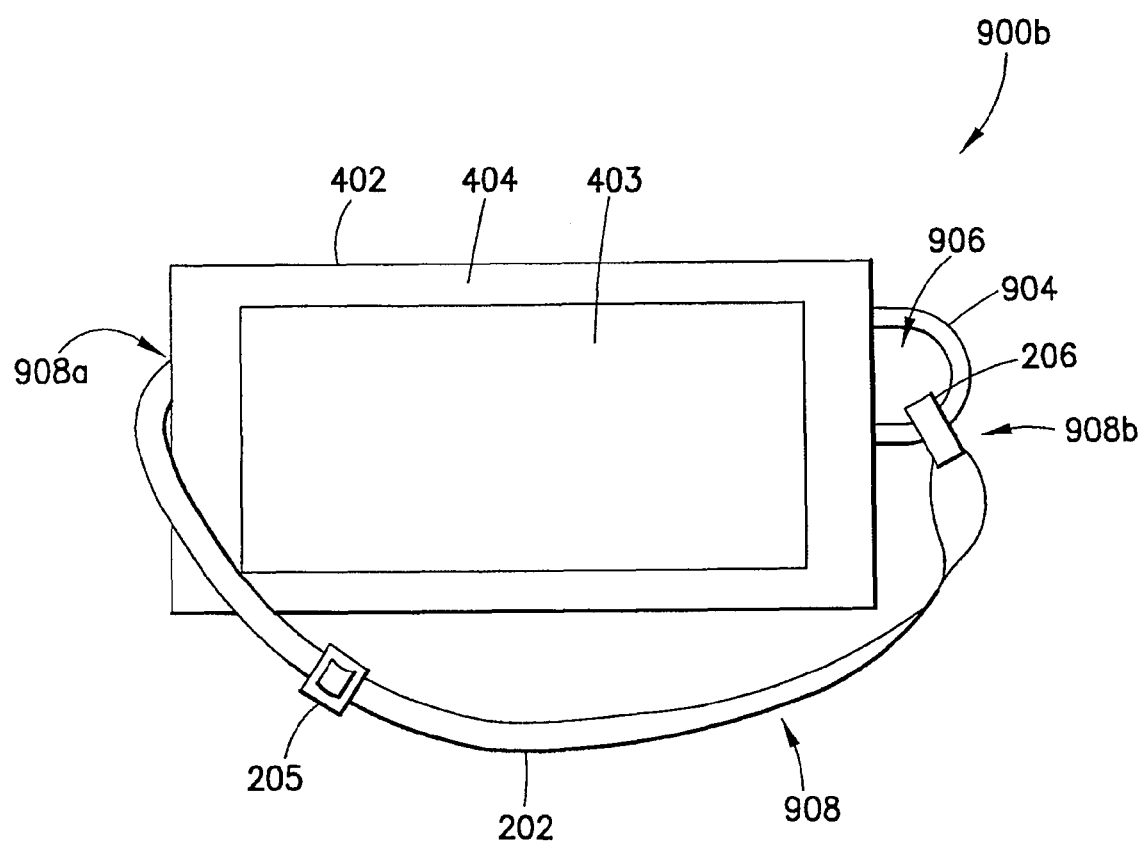

Referring now to FIG. 9B there is illustrated example ad sign 900b according to an example embodiment of the invention. Ad sign 900b includes a safety strap 908 with a first end 908a that is permanently or detachably connected to frame body 402 using any suitable mechanism known in the art, as described above. End 908b of the strap includes a fastener 206 or the like, for example, that is intended to be attached to and removed from the child seat and/or ad sign in order to place a child in and remove the child from the safety strap. As such, strap 908 may include an adjuster 205 but not a buckle 204.

Here, frame body 402 may include an anchor 904, for example, onto which fastener 206 may be connected, as shown in FIG. 9B. Alternatively, fastener 206 may be connected to anchor 904 and to a bar of the seat back or may be inserted through opening 906 of anchor 904 and connected only to the seat back. Rather than an anchor 904, frame body 402 may include an opening formed therein through which fastener 206 may be inserted and connected to the seat back. As another alternative, ad sign 900b may not include an anchor or an opening. Here, fastener 206 may be connected directly to the seat back. One skilled in the art will recognize that other variations may be used.

According to another example embodiment of the invention, ad sign 900b includes two frame bodies. Here, end 908a of the strap and anchor 904, for example, may be situated on the front frame body, the rear frame body, or some combination thereof.

In general, while the present invention has been described as different embodiments of safety strap openings, safety strap anchors, and safety strap attachment mechanisms, one skilled in the art will recognize that an ad sign may include different combinations of the described embodiments. For example, an ad sign may include one safety strap hole as illustrated by ad sign 400a and another safety strap hole as illustrated by ad sign 500.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An ad sign to be mounted on a seat back of a shopping cart child seat, comprising:
   one or more frame bodies configured to display information content, each frame body having a front side and a back side, one of said one or more frame bodies being configured to be connected to a first face of the seat back; and
   a plurality of safety strap anchors on said one frame body, said plurality of safety strap anchors being configured and adapted for securing a child seat safety strap within the child seat;
   wherein said plurality of safety strap anchors extend from a perimeter of said one frame body to form a plurality of fixed loops in a plane of the frame body;
   said plurality of safety strap anchors being configured such that the child seat safety strap can be passed through any of said loops and connected to the seat back, and being further configured so as to limit a movement of the child seat safety strap when the strap is passed through said loop and connected to the seat back; and
   further wherein said plurality of safety strap anchors are disposed on opposed sides of said one frame body.

2. The ad sign of claim 1, further comprising a child seat safety strap that is connected to at least said one frame body.

3. The ad sign of claim 1, further comprising a second frame body configured to be connected to a second face of the seat back, said second frame body comprising a content display area for displaying information content.

4. The ad sign of claim 1, further comprising a content display area on said one frame body for displaying information content.

5. An ad sign to be mounted on a seat back of a shopping cart child seat, comprising:
   one or more frame bodies configured to display information content, each frame body having a front side and a back side, one of said one or more frame bodies being configured to be connected to a first face of the seat back; and
   a plurality of safety strap anchors on said one frame body, said plurality of safety strap anchors being configured and adapted for securing a child seat safety strap within the child seat;
   wherein said plurality of safety strap anchors extend from a perimeter of said one frame body to form a plurality of fixed loops in a plane of the frame body;
   said plurality of safety strap anchors being configured such that the child seat safety strap can be passed through any of said loops and connected to the seat back, and being further configured so as to limit a movement of the child seat safety strap when the strap is passed through said loop and connected to the seat back; and
   further wherein said plurality of safety strap anchors are disposed on a top and bottom of said one frame body.

6. The ad sign of claim 5, further comprising a child seat safety strap that is connected to at least said one frame body.

7. The ad sign of claim 5, further comprising a second frame body configured to be connected to a second face of the seat back, said second frame body comprising a content display area for displaying information content.

8. The ad sign of claim 5, further comprising a content display area on said one frame body for displaying information content.

9. An ad sign to be mounted on a seat back of a shopping cart child seat, comprising:
   one or more frame bodies configured to display information content, each frame body having a front side and a back side, one of said one or more frame bodies being configured to be connected to a first face of the seat back; and
   a plurality of safety strap anchors on said one frame body, said plurality of safety strap anchors being configured and adapted for securing a child seat safety strap within the child seat;
   wherein said plurality of safety strap anchors extend from a perimeter of said one frame body to form a plurality of fixed loops in a plane of the frame body,
   said plurality of safety strap anchors being configured such that the child seat safety strap can be passed through any of said loops and connected to the seat back, and being further configured so as to limit a movement of the child seat safety strap when the strap is passed through said loop and connected to the seat back; and
   further wherein said plurality of safety strap anchors form a contiguous element extending from said perimeter of said frame body and having a plurality of said fixed loops contained within said contiguous element.

10. The ad sign of claim 9, further comprising a child seat safety strap that is connected to at least said one frame body.

11. The ad sign of claim 9, further comprising a second frame body configured to be connected to a second face of the seat back, said second frame body comprising a content display area for displaying information content.

12. The ad sign of claim 9, further comprising a content display area on said one frame body for displaying information content.

* * * * *